(12) United States Patent
Yabe et al.

(10) Patent No.: US 8,537,708 B2
(45) Date of Patent: Sep. 17, 2013

(54) PACKET TRANSMISSION METHOD AND NODES

(75) Inventors: Atsushi Yabe, Kawasaki (JP); Yasuhiro Yoshika, Kawasaki (JP); Yashushi Miyagawa, Kawasaki (JP); Akio Ohhashi, Kawasaki (JP); Isamu Fukuda, Kawasaki (JP); Akihiro Kobayashi, Kawasaki (JP); Kouichirou Higashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 234 days.

(21) Appl. No.: 13/048,518

(22) Filed: Mar. 15, 2011

(65) Prior Publication Data

US 2011/0211471 A1    Sep. 1, 2011

Related U.S. Application Data

(63) Continuation of application No. PCT/JP2008/067028, filed on Sep. 19, 2008.

(51) Int. Cl.
*H04L 12/26* (2006.01)
*H04L 12/28* (2006.01)
*H04J 3/00* (2006.01)
*H04J 3/24* (2006.01)
*G06F 15/16* (2006.01)

(52) U.S. Cl.
USPC ........... 370/252; 370/476; 370/389; 370/390; 370/349; 370/393; 709/237

(58) Field of Classification Search
USPC ................. 370/252, 476, 389, 390, 349, 393; 709/237
See application file for complete search history.

(56) References Cited

U.S. PATENT DOCUMENTS

| 6,754,231 | B1 | 6/2004 | Jonsson et al. |
| 7,948,913 | B1* | 5/2011 | Dinan ........................... 370/252 |
| 2001/0030963 | A1* | 10/2001 | Yoshimura et al. ........... 370/393 |
| 2002/0027882 | A1 | 3/2002 | Burmeister et al. |
| 2002/0059464 | A1 | 5/2002 | Hata et al. |
| 2002/0154600 | A1 | 10/2002 | Ido et al. |

(Continued)

FOREIGN PATENT DOCUMENTS

| JP | 9-116596 | 5/1997 |
| JP | 2002-84338 | 3/2002 |

(Continued)

OTHER PUBLICATIONS

Bormann et al. "IETF RFC 3095 RObust Header Compression (ROHC)", Jul. 2001, Network Working Group, 1-157.*

(Continued)

*Primary Examiner* — Andrew Lai
*Assistant Examiner* — Albert Shih
(74) *Attorney, Agent, or Firm* — Myers Wolin, LLC

(57) ABSTRACT

This is a method for transmitting packets. The transmission method includes measuring a time taken for feedback indicating that a packet including context information has been lost; and switching between a first mode and a second mode based on the measured time taken for the feedback, the first mode being a mode for periodically transmitting a packet including the context information and the second mode being a mode for transmitting a packet including the context information in response to the feedback indicating that a packet including the context information has been lost.

11 Claims, 24 Drawing Sheets

(56) References Cited

U.S. PATENT DOCUMENTS

| | | |
|---|---|---|
| 2004/0202167 A1 | 10/2004 | Jonsson et al. |
| 2005/0094647 A1* | 5/2005 | Hata et al. ............... 370/395.52 |
| 2007/0195764 A1* | 8/2007 | Liu et al. ..................... 370/389 |
| 2008/0151861 A1* | 6/2008 | Zhang ......................... 370/349 |

FOREIGN PATENT DOCUMENTS

| | | |
|---|---|---|
| JP | 2002-124989 | 4/2002 |
| JP | 2002-135362 | 5/2002 |
| JP | 2003-502948 | 1/2003 |
| WO | 00/79763 | 12/2000 |

OTHER PUBLICATIONS

Bormann, "A ROHC Profiles for CRTP (ROHC-CRTP)", Mar. 22, 2007, IETF.org, 1-2.*

International Search Report issued for corresponding International Patent Application No. PCT/JP2008/067028, mailed Dec. 16, 2008.

C. Bormann, et al.,; "RObust Header Compression (ROHC): Framework and four profiles: RTP, UDP, ESP, and uncompressed"; RFC3095, pp. 23-25, 69-73; Jul. 2001, [Ref.; ISR mailed Dec. 16, 2008].

* cited by examiner

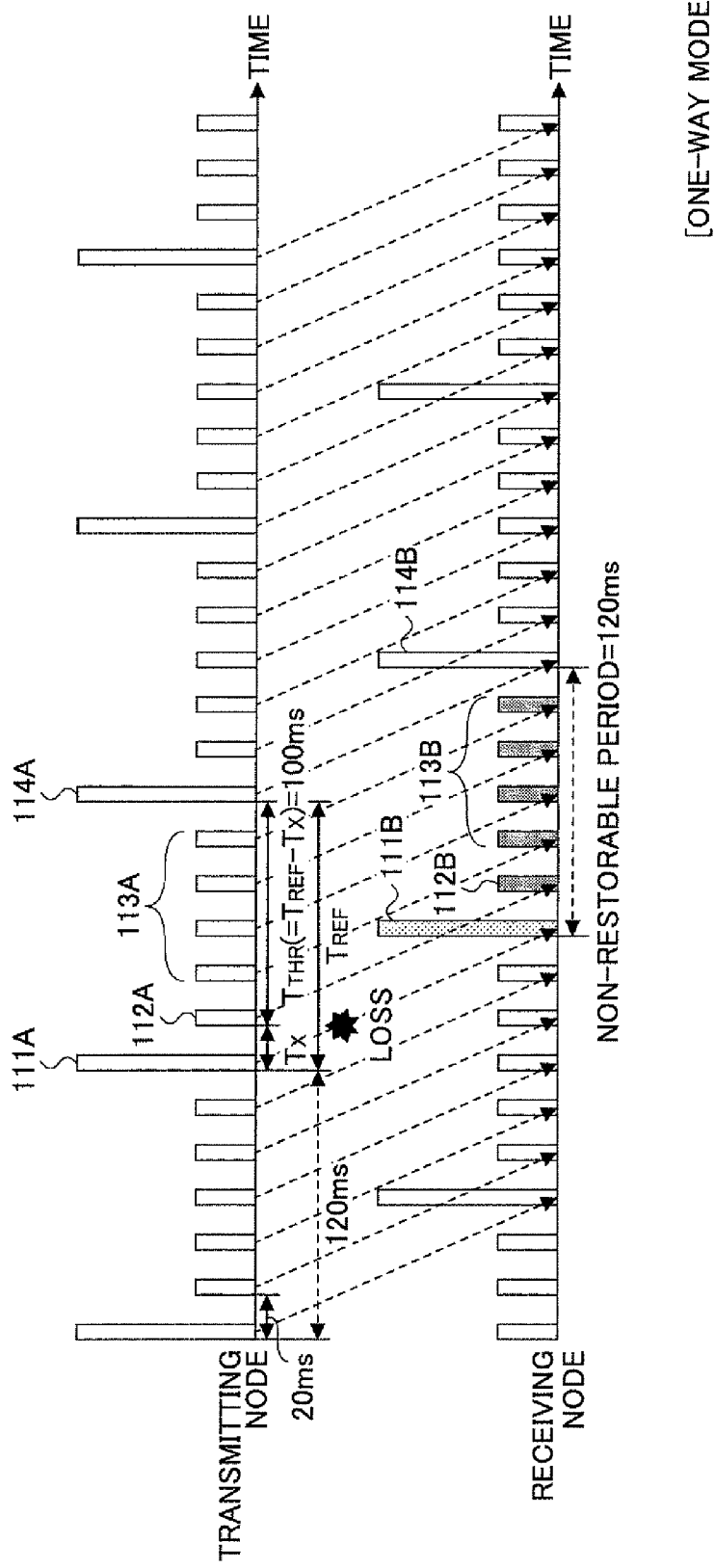

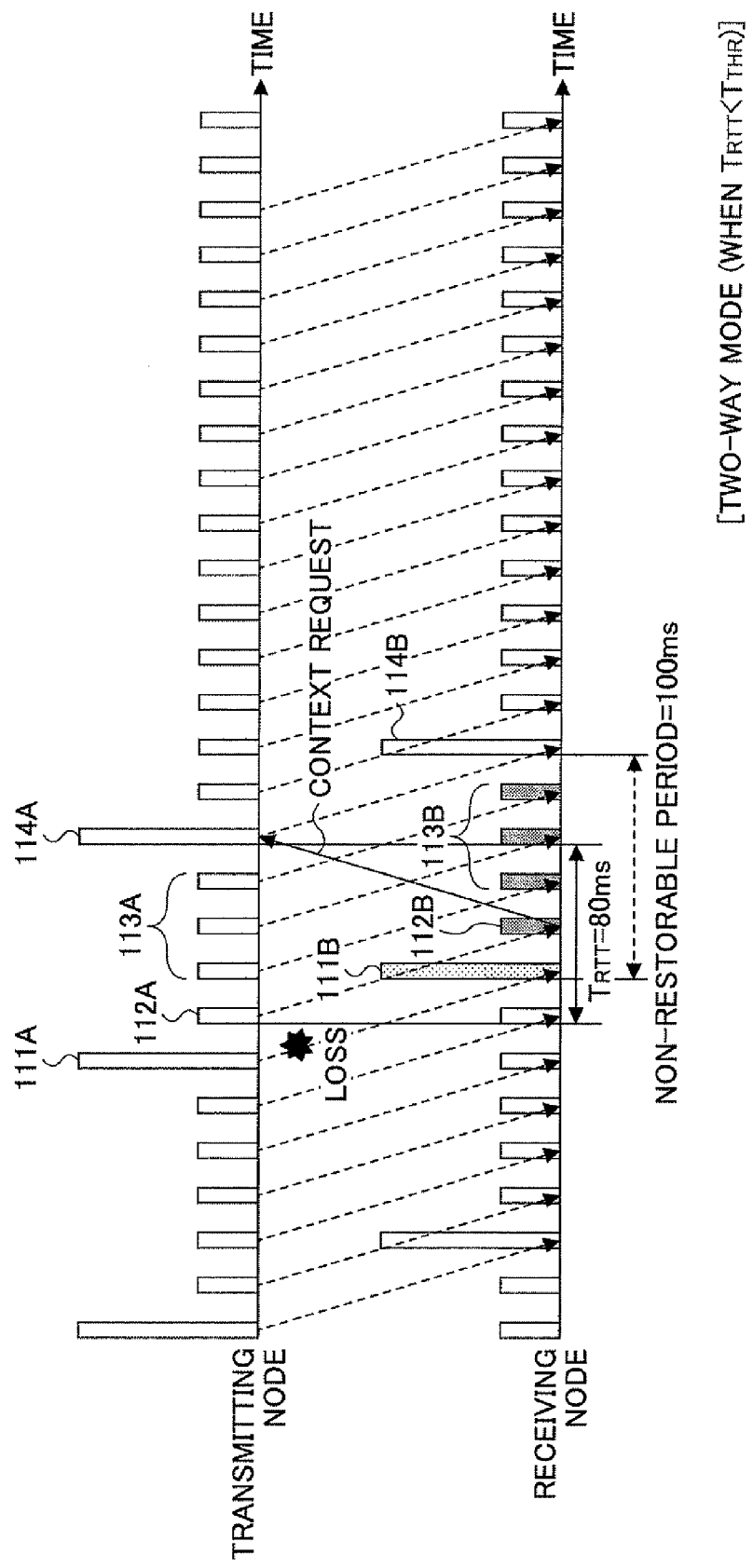

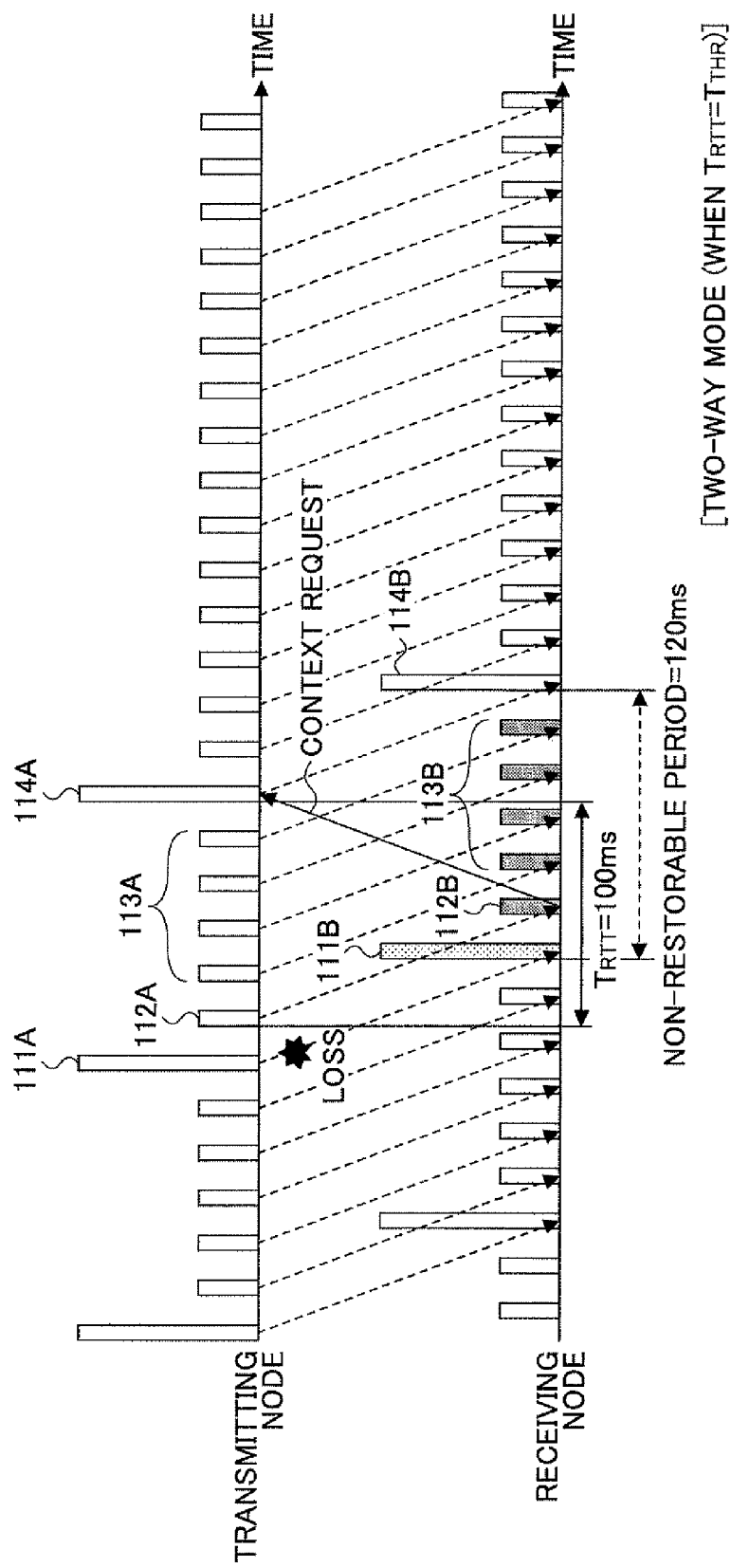

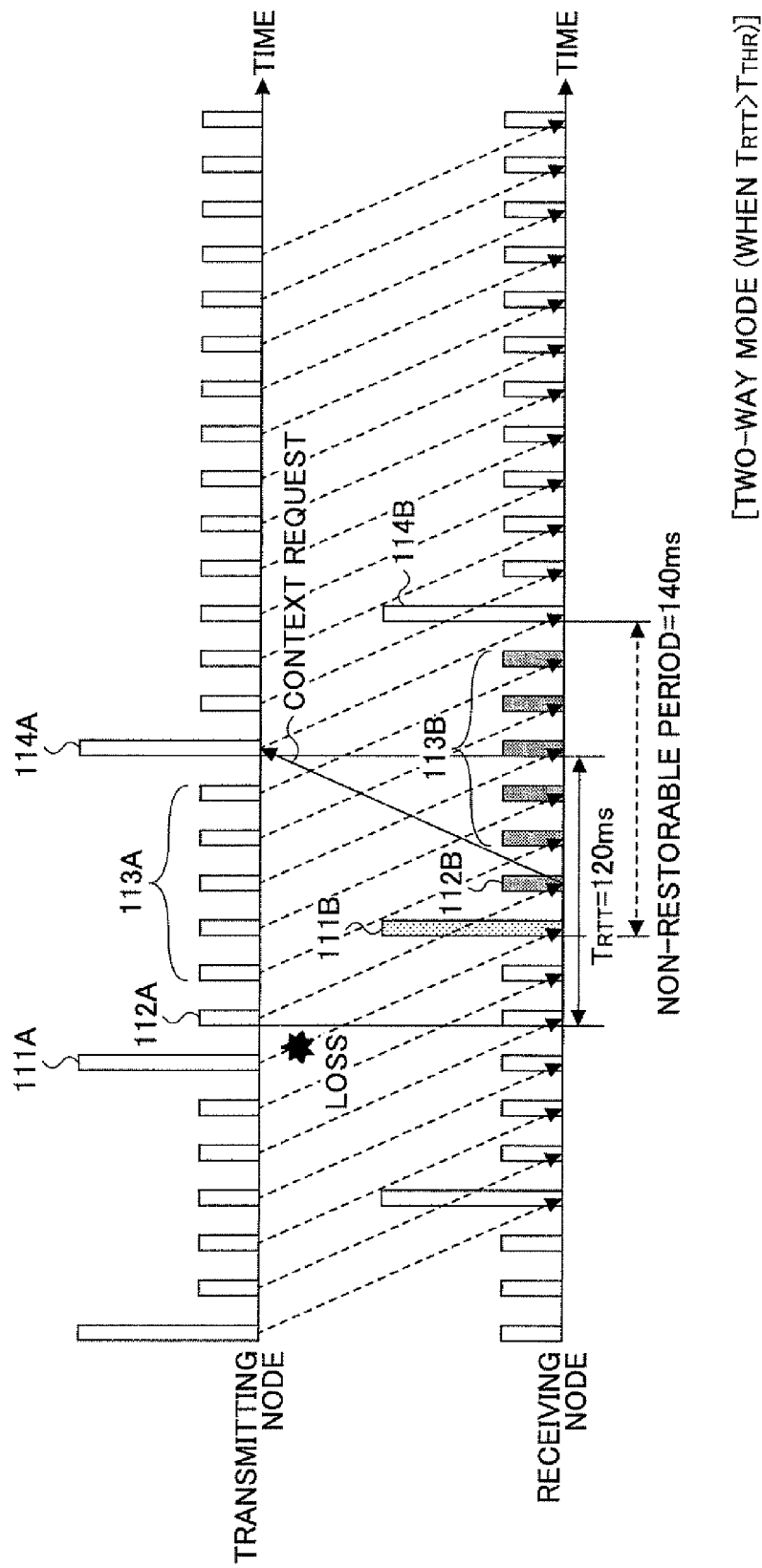

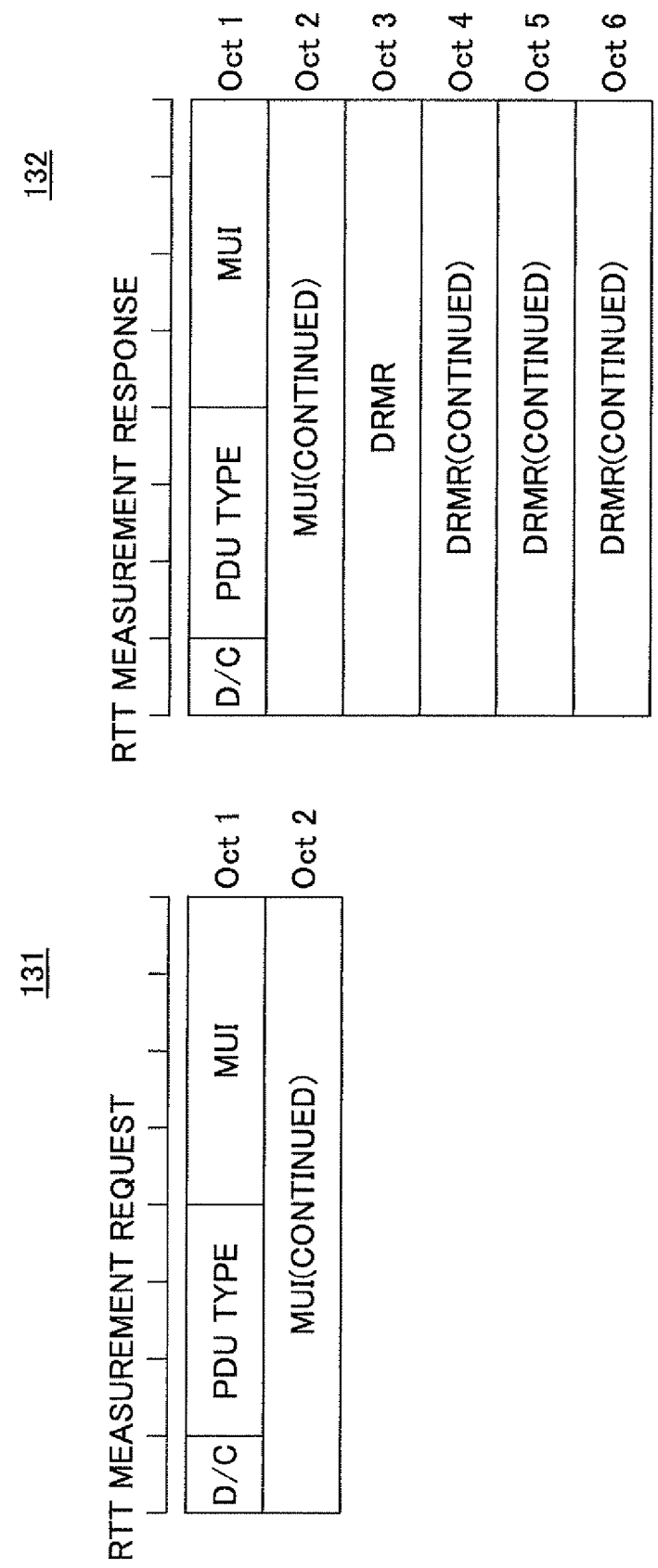

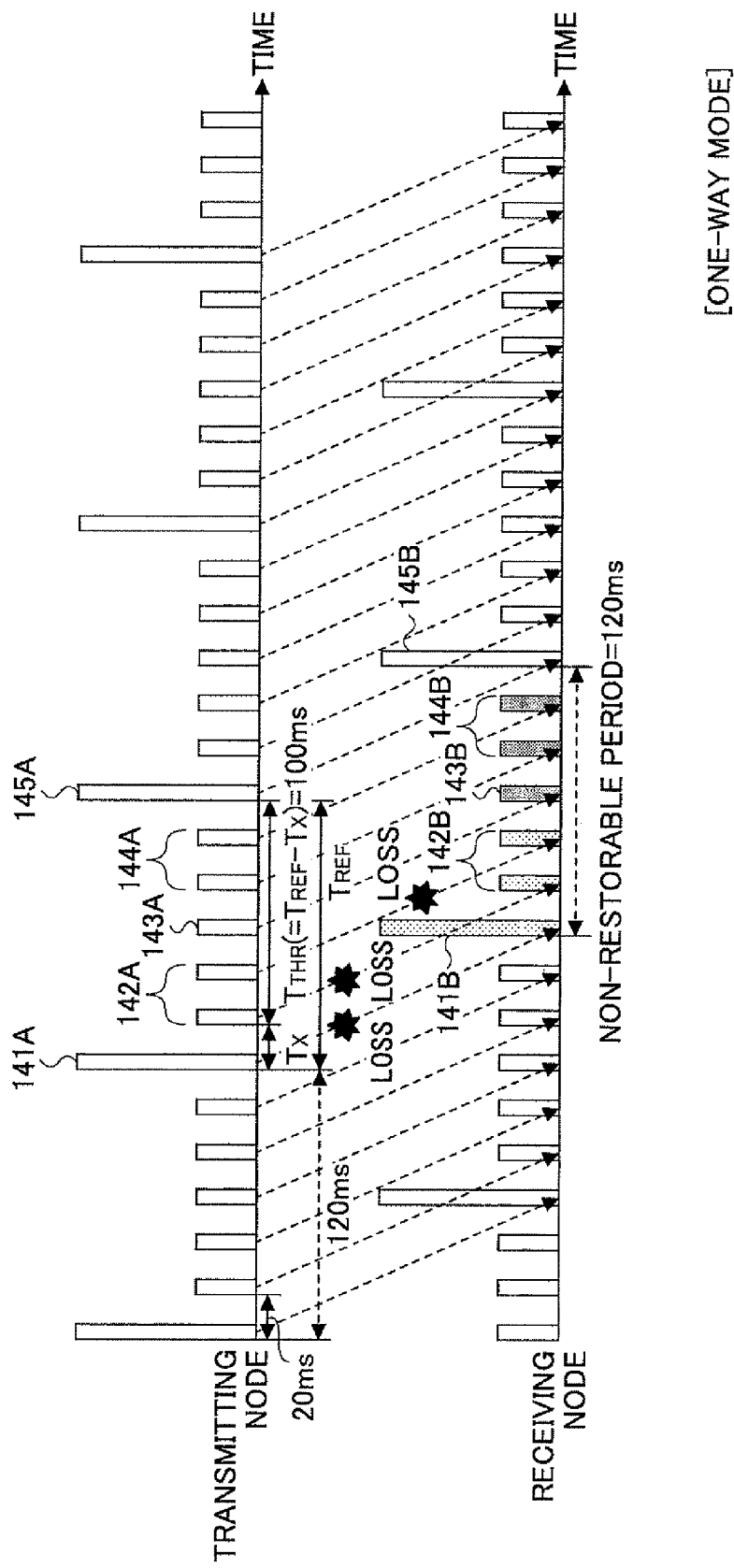

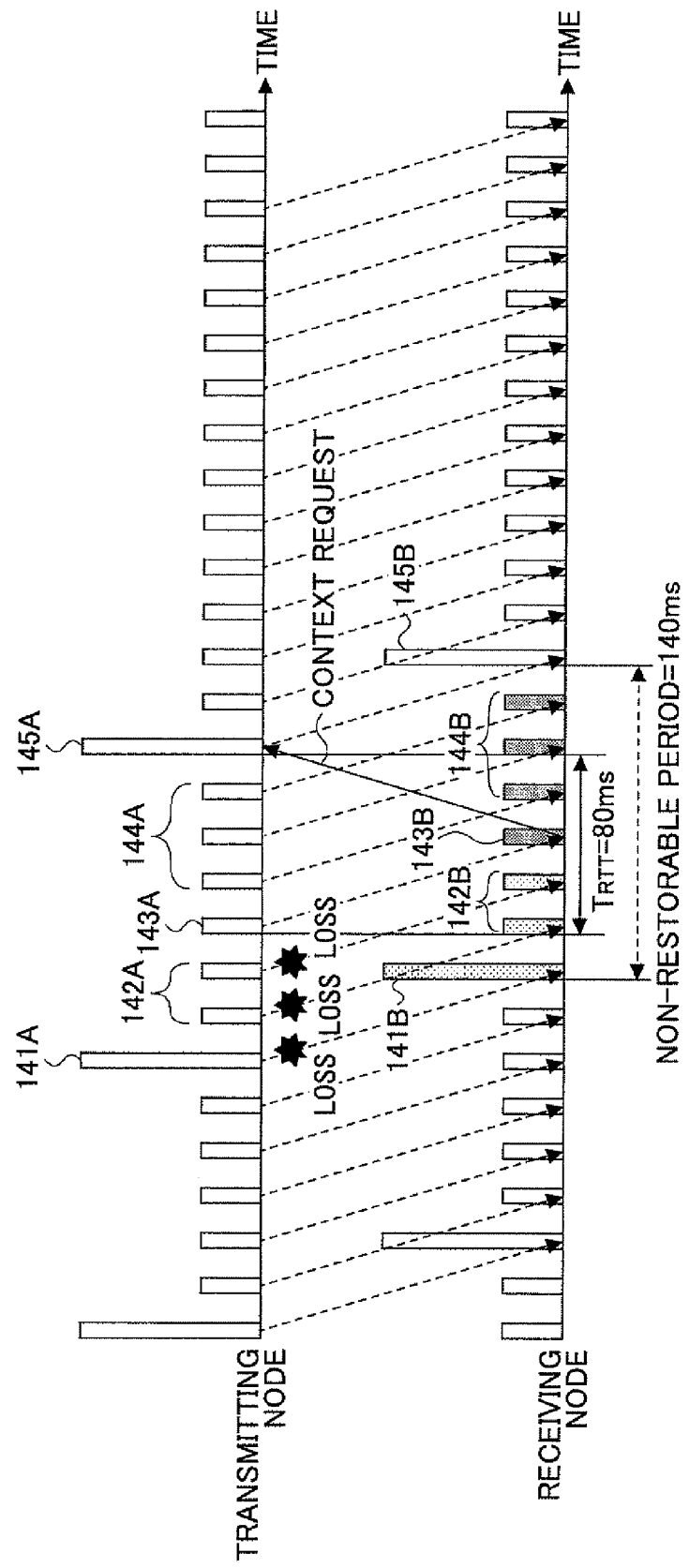

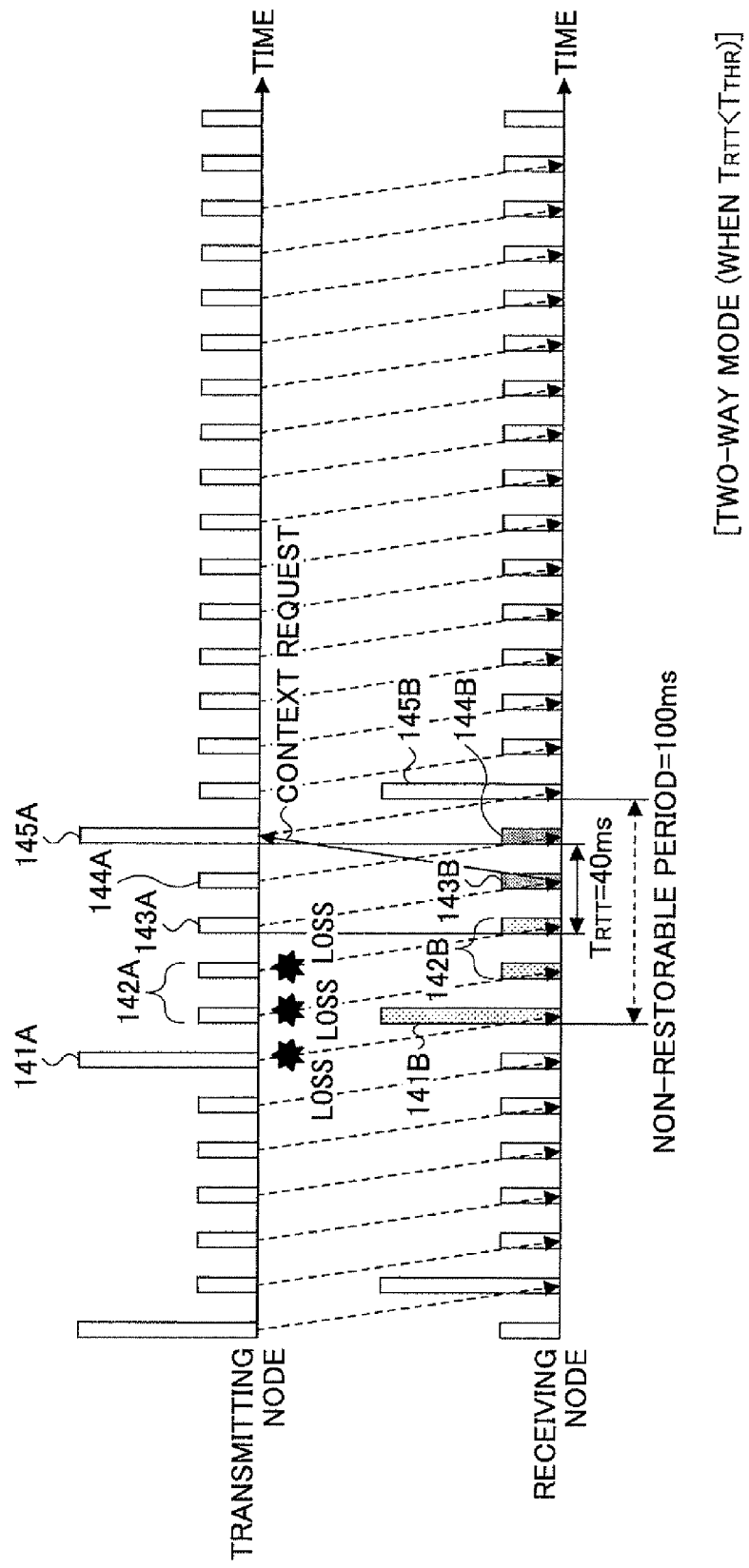

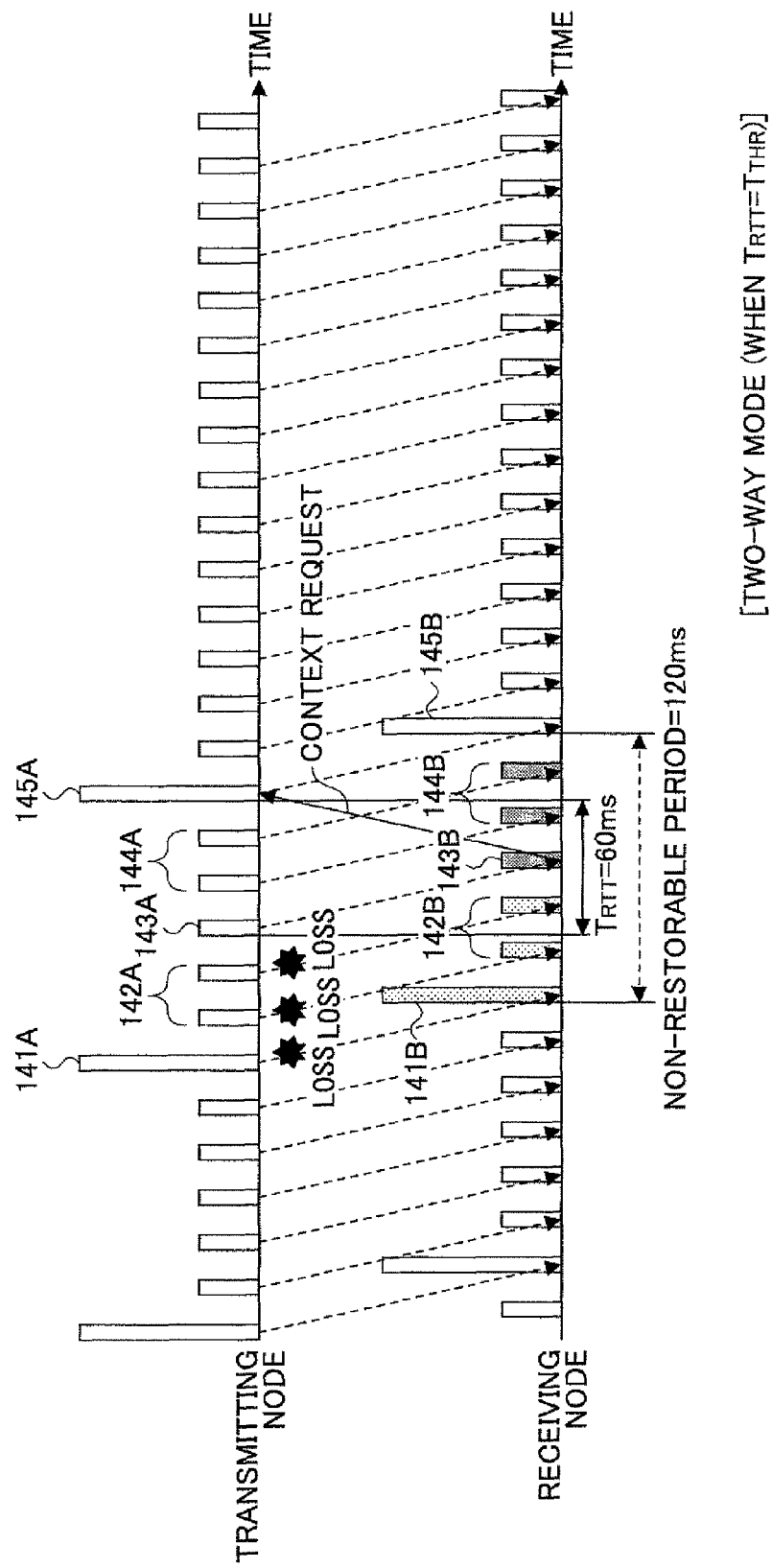

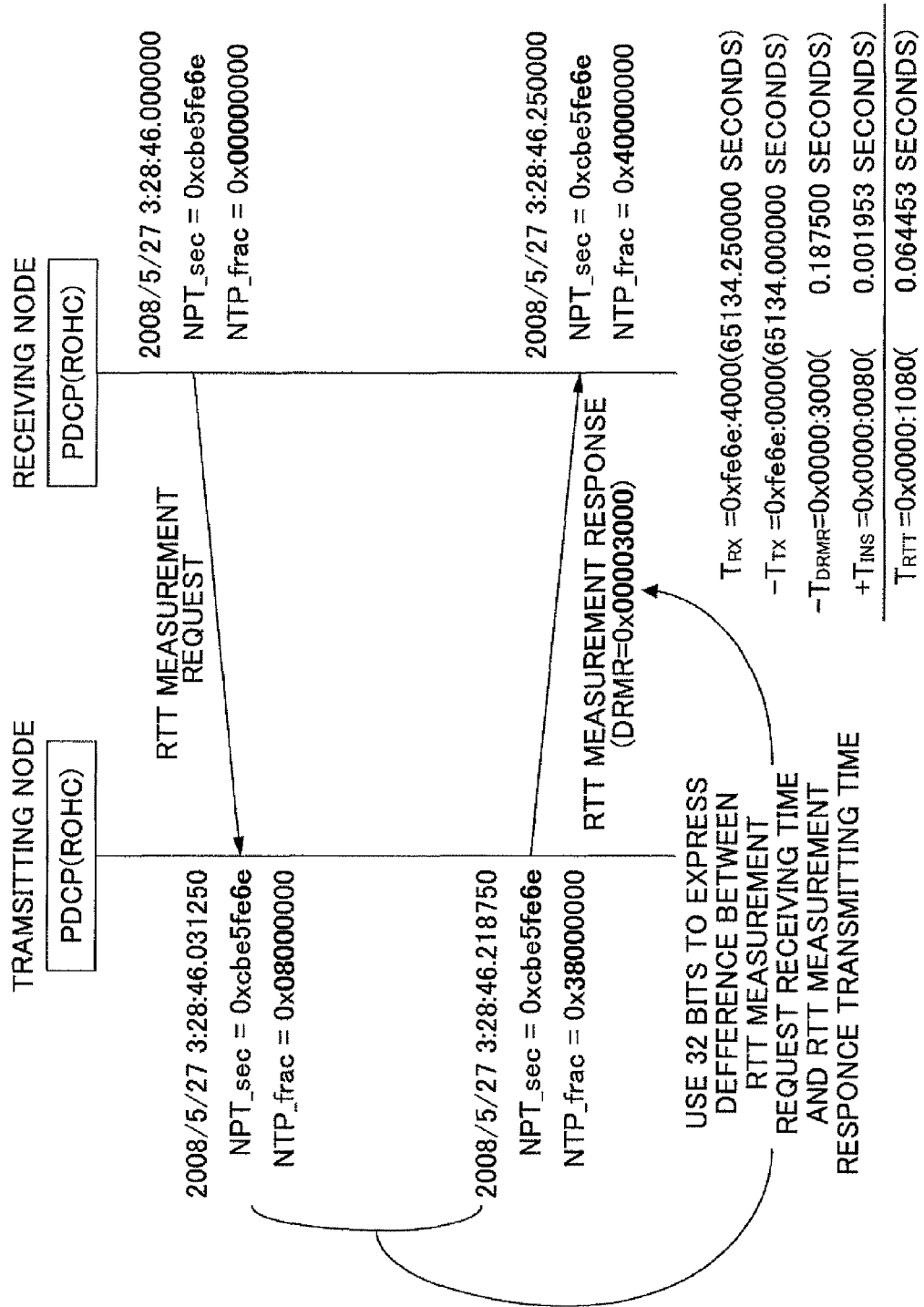

PACKET TRANSMISSION METHOD AND NODES

CROSS-REFERENCE TO RELATED APPLICATION

This is a continuation of PCT Application PCT/JP2008/067028 filed Sep. 19, 2008, now pending, the entire contents of which are herein wholly incorporated by reference.

TECHNICAL FIELD

The present invention is related to the field of mobile communications, and more particularly to a packet transmission method and nodes.

BACKGROUND ART

Presently, 3GPP, which is an organization for standardizing technical specifications of third-generation mobile phones, is promoting the international standardization of LTE (Long Term Evolution). LTE is for significantly improving the performance of 3G systems. Specifically, LTE is for implementing high-speed transmission in mobile communications, to establish an environment for providing high-level services such as high-speed video distribution. Furthermore, LTE is expected to be a system for efficient usage of frequencies. Furthermore, in 3G systems, voice communication and data communication are provided by different infrastructures. However, in LTE, all communication infrastructures for mobile phones are integrated in an IP based infrastructure. Accordingly, instead of the conventional mobile system including a circuit switching type infrastructure, the LTE system is expected to provide a mobile system that has been completely turned into an IP-based system.

FIG. 1 illustrates an example of an LTE network. In the LTE network illustrated in FIG. 1, a user terminal (UT) and base stations (eNodeB, eNB) are wirelessly connected, and the base stations are connected to aGW (E-UTRAN Access Gateway). The aGW is connected to IASA (Inter AS Anchor), which is an anchor device in an access system. The IASA includes SAE-A (SAE Anchor) that is an anchor device with respect to an external network, and 3GPP-A (3GPP Anchor) that is an anchor device with respect to a network specified by 3GPP. Furthermore, aGW and IASA are connected to HSS (Home Subscriber Server). Furthermore, IASA is connected to another network via PCRF (Policy & Charging Rule Function).

Real-time data in a mobile system (speech call, video streaming, etc.) is expected to be turned into IP-based data by protocol stacks as illustrated in FIGS. 2 and 3. FIG. 2 illustrates an example of a speech call protocol stack (for PSTN). FIG. 3 illustrates an example of a speech call protocol stack (in own AS). That is to say, FIG. 2 illustrates the connection of an LTE system and an existing circuit switching system, and FIG. 3 illustrates the connection of plural LTE systems.

Real-time data (typically speech call) is transferred by RTP/UDP/IP, similar to VoIP used in a typical wired IP network. The overhead increases because headers of protocols are attached to the data. Thus, the bandwidth in a wireless zone is limited. Accordingly, for the purpose of improving the usage efficiency of a wireless zone, the header is preferably compressed. In the LTE system, the function of compressing the header is expected to be implemented by ROHC (RObust Header Compression: RFC 3095), which is included in the function of the PDCP (Packet Data Convergence Protocol: TS36.323) that is terminated between the base station device (eNodeB) and the user terminal.

MEANS TO SOLVE THE PROBLEMS

A packet transmission method according to one embodiment includes measuring a time taken for feedback indicating that a packet including context information has been lost; and switching between a first mode and a second mode based on the measured time taken for the feedback, the first mode being a mode for periodically transmitting a packet including the context information and the second mode being a mode for transmitting a packet including the context information in response to the feedback indicating that a packet including the context information has been lost.

In the above described transmission method, the measuring includes transmitting a measurement request from a receiving node to a transmitting node, and transmitting a measurement response from the transmitting node to the receiving node, the measurement response indicating an elapsed time from when the measurement request is received.

Furthermore, in the above described transmission method, the switching between the first mode and the second mode includes monitoring lost packets, and comparing the measured time taken for the feedback with a threshold corresponding to a number of the lost packets.

A receiving node according to another embodiment includes a control unit that measures a time taken for feedback indicating that a packet including context information has been lost, and that causes a transmitting node to switch between a first mode and a second mode based on the measured time taken for the feedback, the first mode being a mode for periodically transmitting a packet including the context information and the second mode being a mode for transmitting a packet including the context information in response to the feedback from the receiving node.

A transmitting node according to yet another embodiment includes a measurement process unit that receives, from a receiving node, a measurement request requesting to measure a time taken for feedback from the receiving node, the feedback indicating that a packet including context information has been lost, and that transmits a measurement response indicating an elapsed time from when the measurement request is received.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF DRAWINGS

FIG. 11A illustrates an example of a non-restorable period in a ROHC operation mode.

FIG. 11B illustrates another example of a non-restorable period in a ROHC operation mode.

FIG. 11C illustrates yet another example of a non-restorable period in a ROHC operation mode.

FIG. 11D illustrates yet another example of a non-restorable period in a ROHC operation mode.

FIG. 13 illustrates frame formats of the RTT measurement request and the RTT measurement response.

FIG. 14A illustrates an example of a non-restorable period in a ROHC operation mode in an ROHC operation mode switching method according to another embodiment.

FIG. 14B illustrates an example of a non-restorable period in a ROHC operation mode in an ROHC operation mode switching method according to another embodiment.

FIG. 14C illustrates an example of a non-restorable period in a ROHC operation mode in an ROHC operation mode switching method according to another embodiment.

FIG. 14D illustrates an example of a non-restorable period in a ROHC operation mode in an ROHC operation mode switching method according to another embodiment.

FIG. 18 illustrates an example of measuring RTT.

BEST MODE FOR CARRYING OUT THE INVENTION

Figure 1:
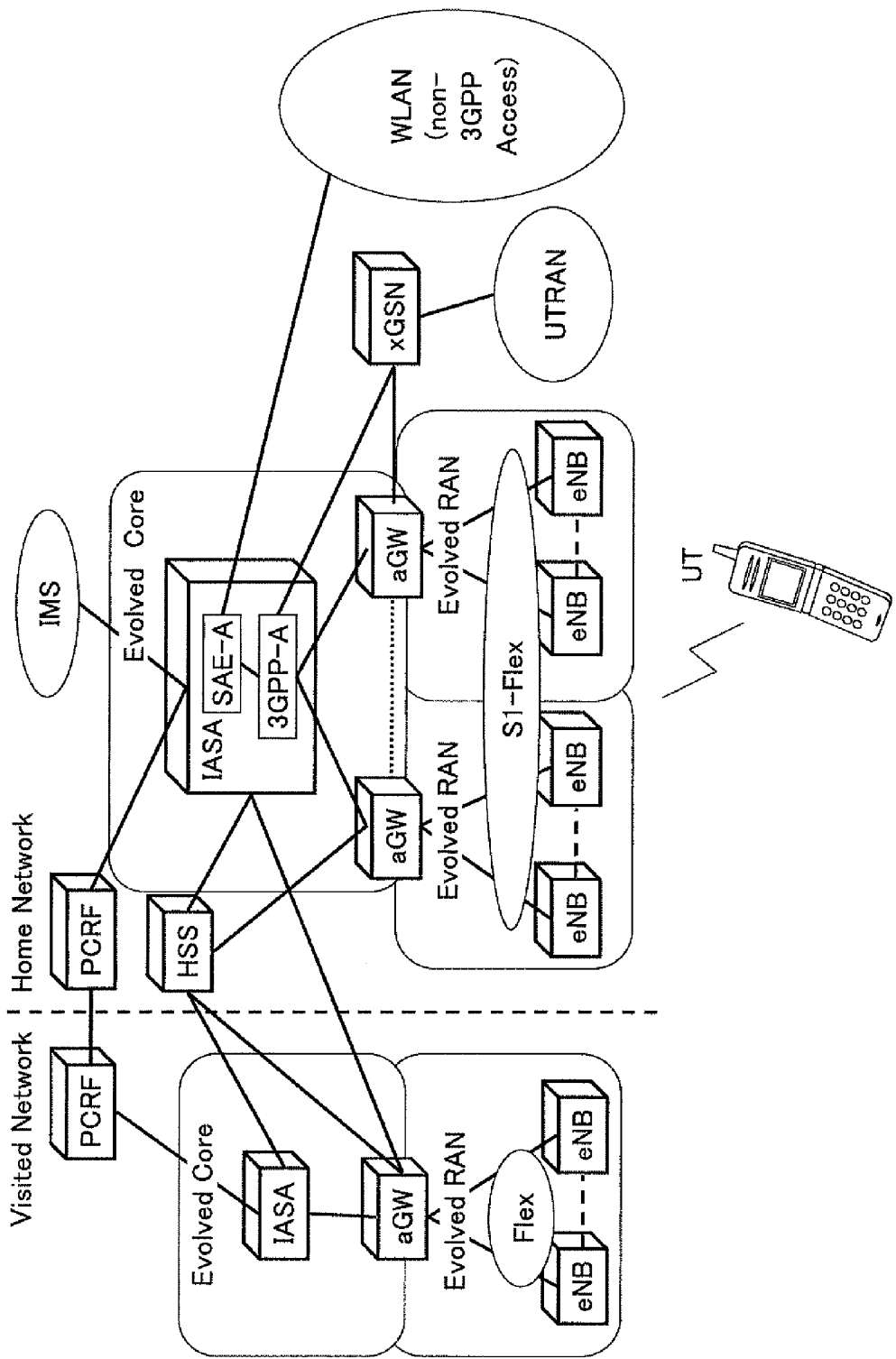
FIG. 1 illustrates an example of a network.
Figure 2:
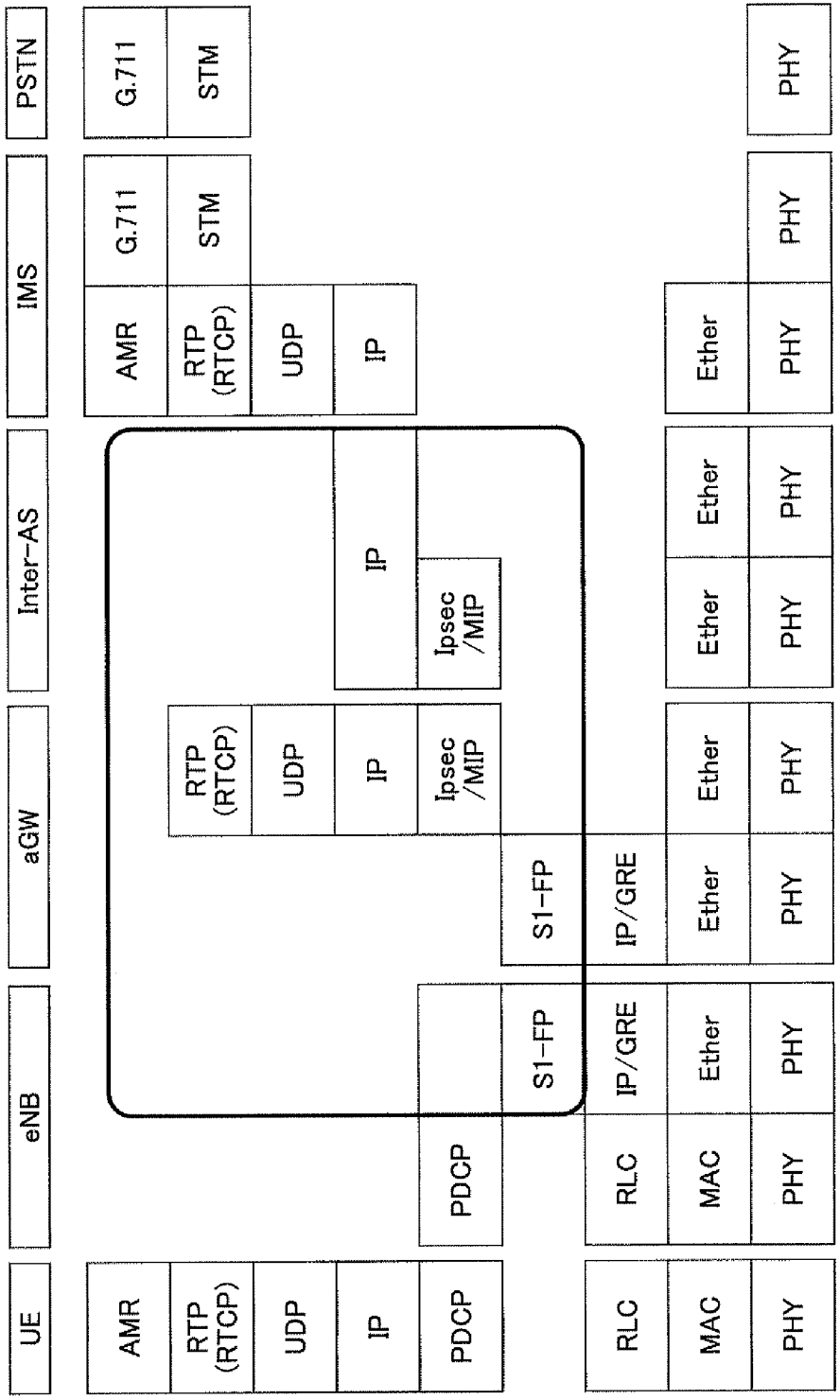
FIG. 2 illustrates an example of a speech call protocol stack (for PSTN).
Figure 3:
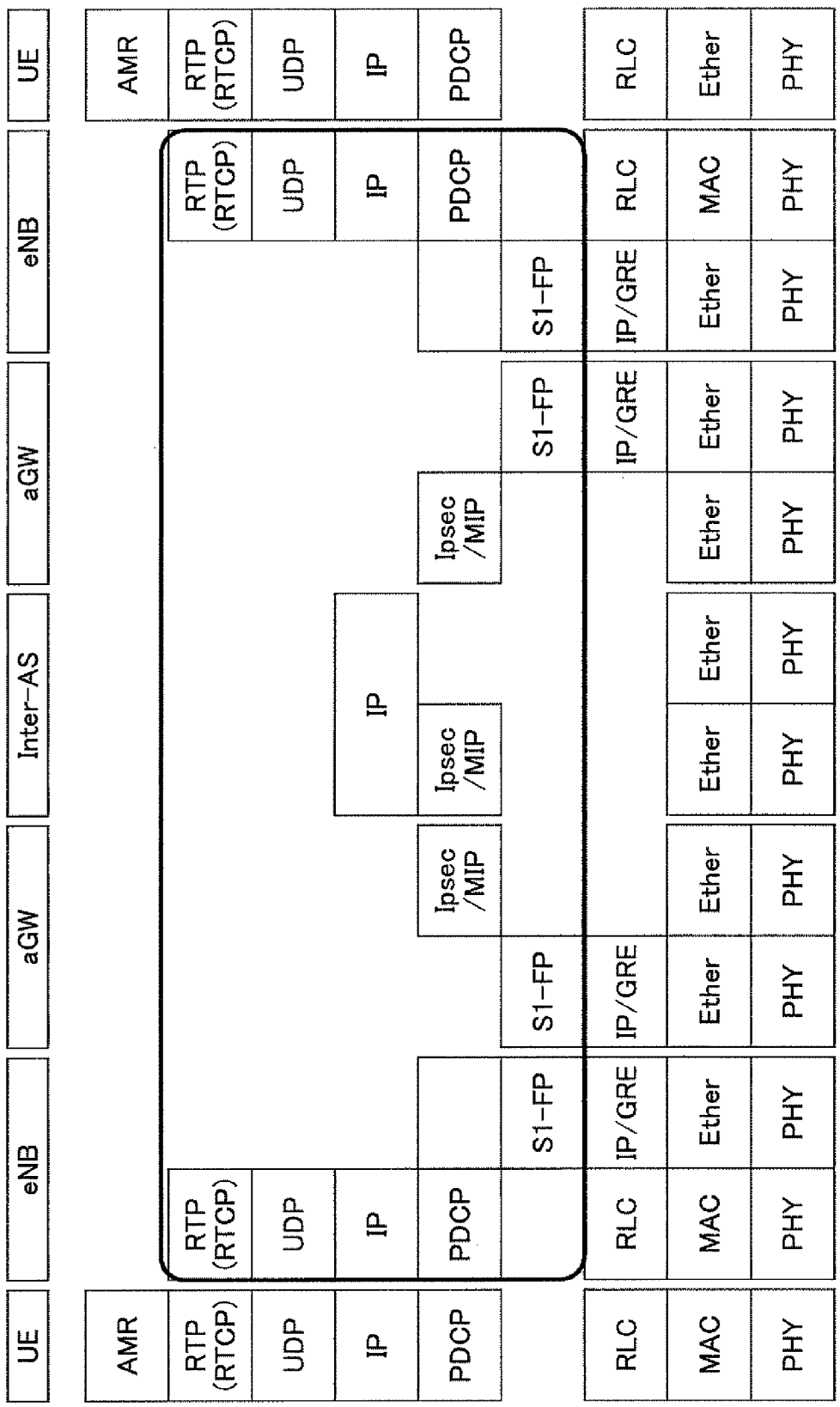
FIG. 3 illustrates an example of a speech call protocol stack (in local AS).

Speech call in the downlink direction from the base station (eNB) to the user terminal (UE) is taken as an example. As illustrated in FIG. 2, the voice data (AMR data) is transmitted from the network side (i.e., the IMS side) by RTP/UDP/IP, and the header of RTP/UDP/IP is compressed by a ROHC (Robust Header Compression) function of the PDCP at the base station (eNB). The voice data whose header has been compressed is transmitted to the user terminal (UE). At the user terminal (UE), the header is decompressed by the ROHC function of the PDCP protocol, so that the original voice data is restored.

Figure 4:
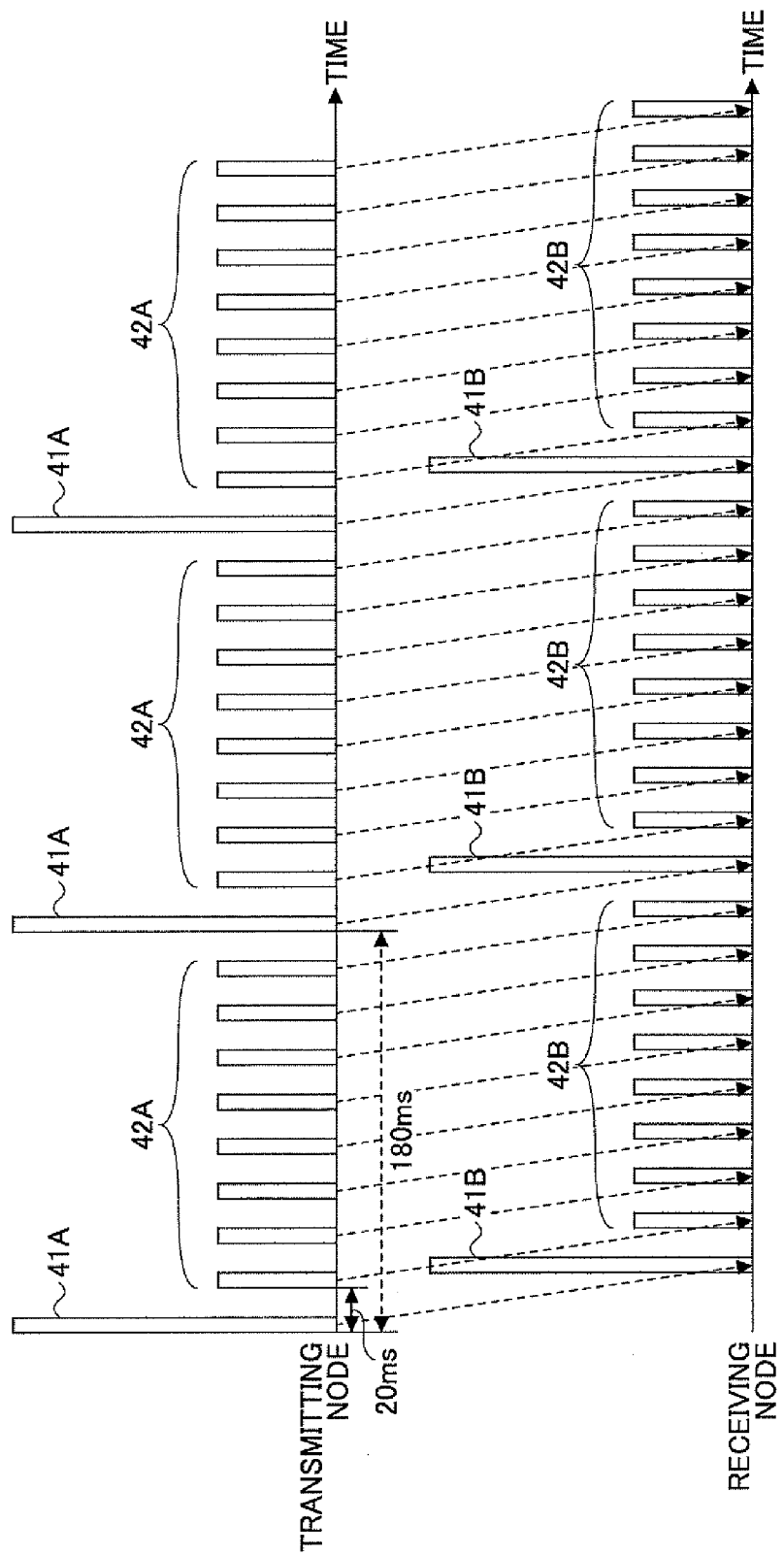
FIG. 4 illustrates a voice transmission state (one-way mode).

FIG. 4 illustrates a voice transmission state (one-way mode). The voice data transferred by RTP/UDP/IP is transferred as frames in 20 [ms] periods between the base station (transmitting node) and the user terminal (receiving node). In the PDCP layer, the transmitting node transmits uncompressed-header frames 41A (in which the header is uncompressed) to the receiving node, when the transmission starts and at subsequent timings (for example, when the timer expires). However, in other periods, the transmitting node transmits compressed-header frames 42A (in which the header is compressed) to the receiving node. Accordingly, the receiving node receives uncompressed-header frames 41B and compressed-header frames 42A.

Figure 5:
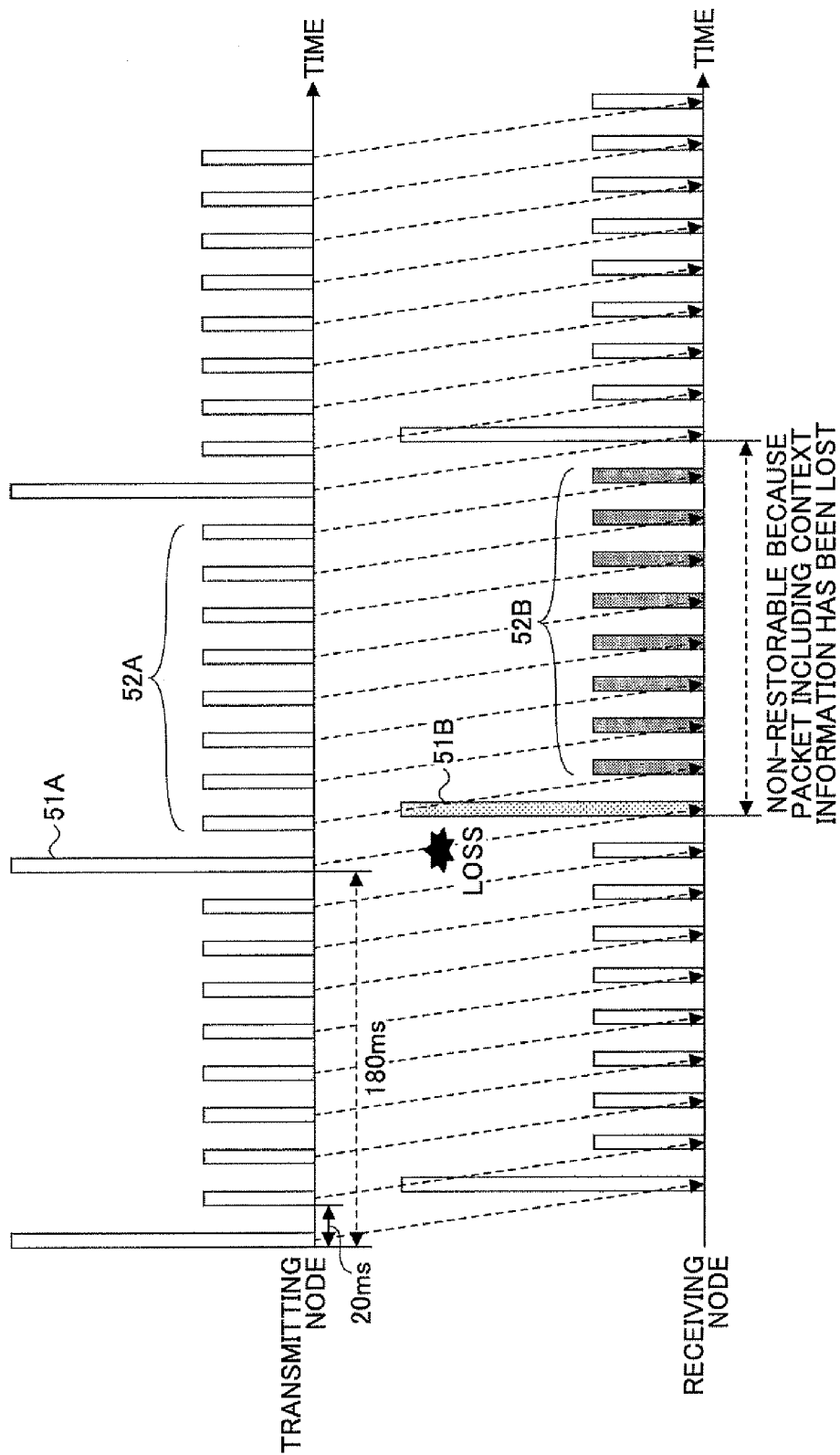
FIG. 5 illustrates a voice transmission state (one-way mode) when there is a packet loss.

The ROHC uses information (context) included in a header that has been previously received, in order to decompress (restore) the compressed header. Therefore, if the context is lost or damaged, it is not possible to decompress the compressed header. Particularly, when a frame including an uncompressed header is lost due to an error in the wireless zone, it is not possible to restore a compressed header in a subsequent frame, even if the frame including the compressed header reaches the destination. Consequently, such frames with compressed headers are discarded in the PDCP layer. This is repeatedly continued until the next frame including an uncompressed header is received and the context is restored. These operations are illustrated in FIG. 5. FIG. 5 illustrates a voice transmission state in a one-way mode when there is a packet loss. When frames are discarded as described above, the quality of the voice becomes degraded.

Meanwhile, in some cases, the size of a frame including an uncompressed header is three times the size of a frame including a compressed header. Thus, from the viewpoint of the usage efficiency of the transmission path, the frequency of transmitting frames including uncompressed headers is preferably low.

Embodiments will be explained in detail with reference to accompanying drawings. The same components or corresponding components are denoted by the same reference numerals throughout the drawings.

In the following description, it is assumed that real-time data such as voice data is transmitted from a base station (transmitting node) to a user terminal (receiving node). It is obvious to those skilled in the art that the real-time data such as voice data may be transmitted from the user terminal to the base station in other embodiments.

Furthermore, it is assumed that the header in a frame of real-time data such as voice data is compressed by an ROHC function of PDCP. In other embodiments, the header may be compressed according to other protocols.

As operation modes of ROHC (Robust Header Compression: RFC3095) of the PDCP (Packet Data Convergence Protocol: TS36.323), a unidirectional mode and a bidirectional mode are specified. As the bidirectional mode, an optimistic mode and a reliable mode are specified. In the following, a one-way mode indicates a unidirectional mode and a two-way mode indicates a bidirectional optimistic mode. The respective modes are described below.

In the one-way mode (unidirectional mode), the receiving node does not perform feedback, and only the transmitting node transmits a context at a constant frequency to assure the quality of communications. Because no feedback is performed, the band frequency in the opposite direction is not compressed. The data loss time when the context is lost depends on the context transmission frequency. FIGS. 4 and 5 illustrate a case of the one-way mode.

In the two-way mode (bidirectional optimistic mode), the receiving node performs feedback for assuring the quality of communications. A context is transmitted only when necessary, and therefore frames including compressed headers are frequently transmitted. The data loss time when a context is lost depends on the feedback time.

Figure 6:
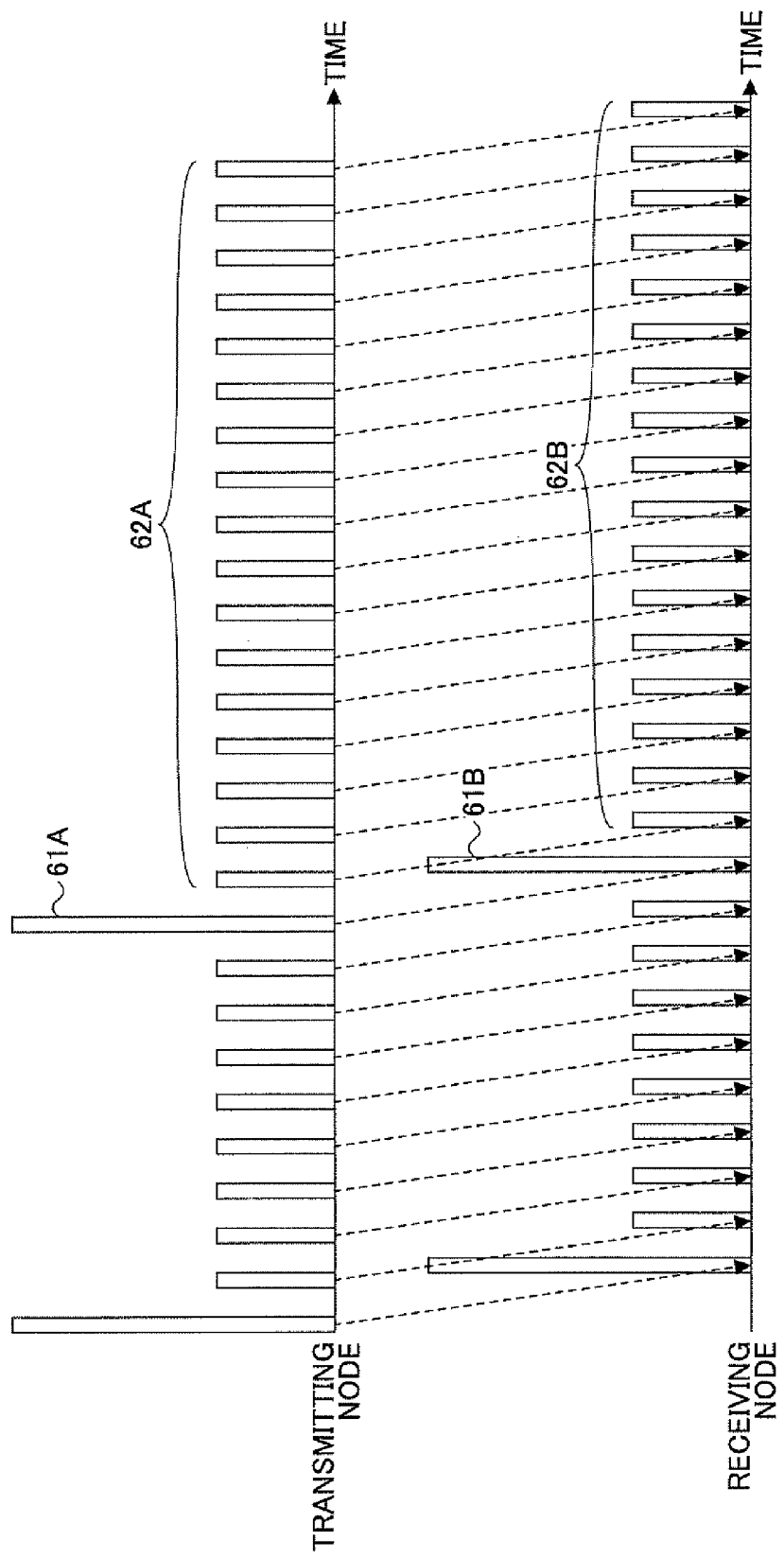
FIG. 6 illustrates a voice transmission state (two-way mode).

FIG. 6 illustrates a voice transmission state in a two-way mode. As illustrated in FIG. 6, the transmitting node transmits a frame 61A including an uncompressed header, and then transmits frames 62A including compressed headers unless there is feedback from the receiving node. Accordingly, the receiving node receives a frame 61B including an uncompressed header and frames 62B including compressed headers. In this case, the frequency of transmitting frames including uncompressed headers is lower than that in the one-way mode illustrated in FIG. 4, because in this case, frames 61A including uncompressed headers are not periodically transmitted.

Figure 7:
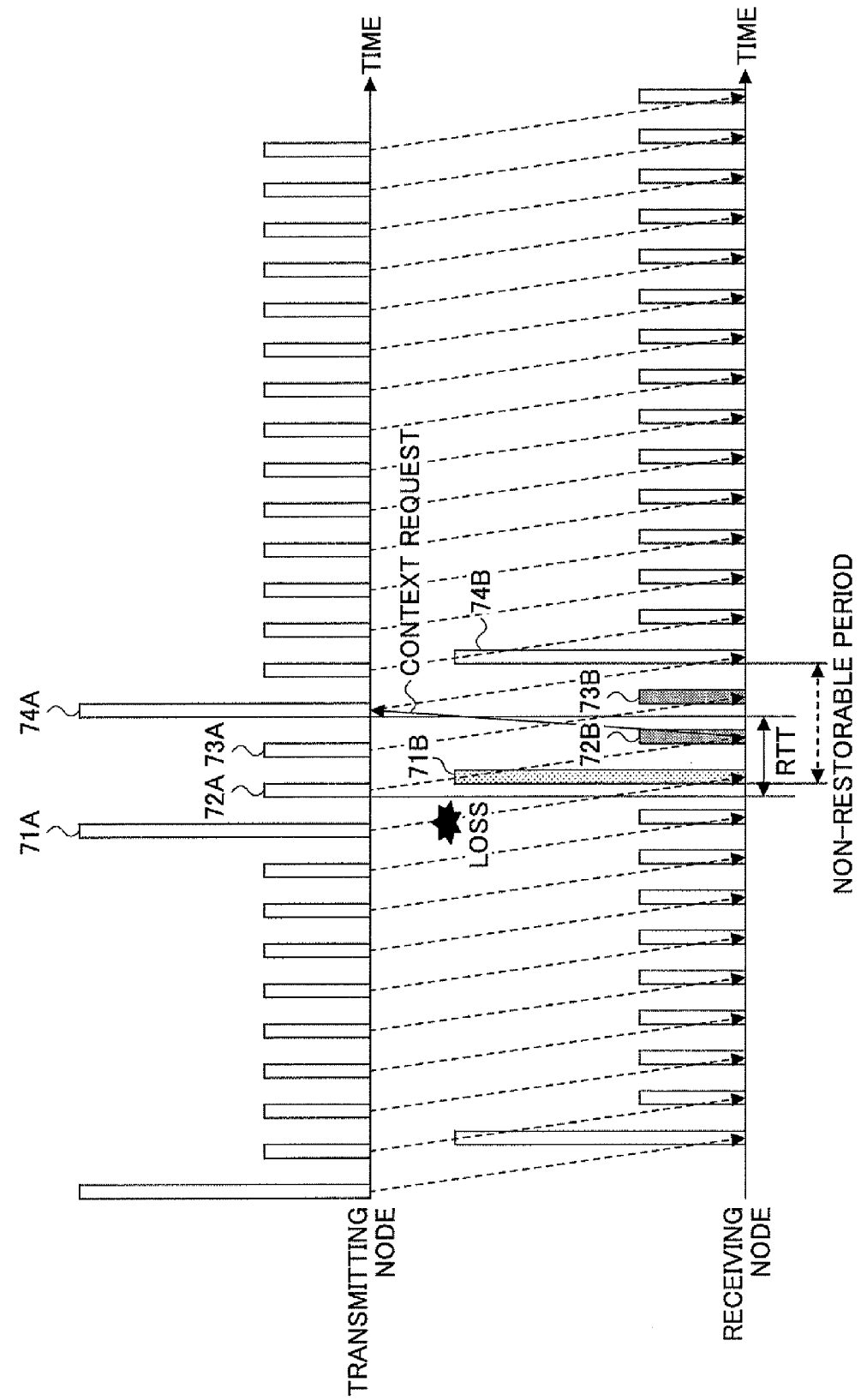
FIG. 7 illustrates a voice transmission state (two-way mode) when there is a packet loss.

FIG. 7 illustrates a voice transmission state in a two-way mode when there is a packet loss. As illustrated in FIG. 7, it is assumed that the transmitting node transmits a frame 71A including an uncompressed header, but the frame 71A is lost due to some reason and does not reach the receiving node. That is to say, it is assumed that a frame 71B including the uncompressed header corresponding to the frame 71A is lost, and therefore the receiving node does not receive the frame 71B.

After transmitting the frame 71A, the transmitting node transmits a frame 72A including a compressed header, to the receiving node. The frame 72A reaches the receiving node (as a frame 72B) without being lost. However, because the frame 71B has been lost, it is not possible for the receiving node to use the context of the frame 71B, and therefore it is not possible for the receiving node to properly restore the frame 72B. Accordingly, the receiving node transmits an error recovery request (feedback) to the transmitting node.

Before receiving the error recovery request (feedback) from the receiving node, the transmitting node transmits a frame 73A including a compressed header. This frame 73A also reaches the receiving node (as a frame 73B) without being lost. However, because the frame 71B has been lost, it is not possible for receiving node to use the context of the frame 71B, and therefore it is not possible for the receiving node to properly restore the frame 73B either.

When the error recovery request is received from the receiving node, the transmitting node transmits a frame 74A including an uncompressed header. The frame 74A reaches the receiving node (as a frame 74B) without being lost.

Figure 8:
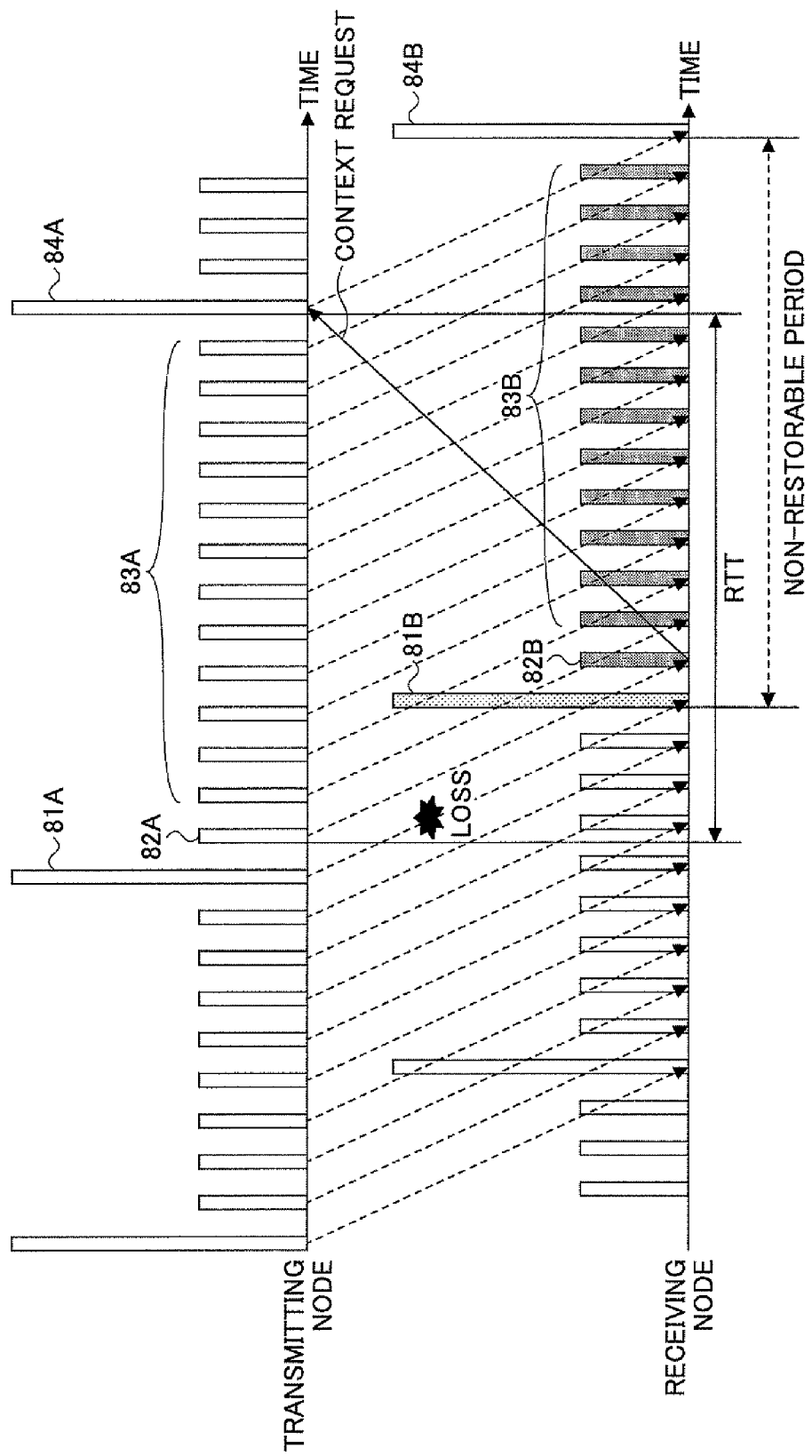
FIG. 8 illustrates another example of a voice transmission state (two-way mode) when there is a packet loss.

Meanwhile, FIG. 8 illustrates another example of a voice transmission state in a two-way mode when there is a packet loss. As illustrated in FIG. 8, it is assumed that the transmitting node transmits a frame 81A including an uncompressed header, but the frame 81A is lost due to some reason and does not reach the receiving node. That is to say, it is assumed that a frame 81B including the uncompressed header corresponding to the frame 81B is lost, and therefore the receiving node does not receive the frame 81B.

After transmitting the frame 81A, the transmitting node transmits a frame 82A including a compressed header, to the receiving node. The frame 82A reaches the receiving node (as a frame 82B) without being lost. However, because the frame 81B has been lost, it is not possible for the receiving node to use the context of the frame 81B, and therefore it is not possible for the receiving node to properly restore the frame 82B. Accordingly, the receiving node transmits an error recovery request (feedback) to the transmitting node.

Before receiving the error recovery request (feedback) from the receiving node, the transmitting node transmits frames 83A including compressed headers. These frames 83A also reach the receiving node (as frames 83B) without being lost. However, because the frame 81B has been lost, it is not possible for the receiving node to use the context of the frame 81B, and therefore it is not possible for the receiving node to properly restore the frames 83B either.

When the error recovery request is received from the receiving node, the transmitting node transmits a frame 84A including an uncompressed header. The frame 84A reaches the receiving node (as a frame 84B) without being lost.

The examples in FIGS. 7 and 8 are the same in that the frames 71A and 81A including uncompressed headers (frames 71B and 81B at the receiving nodes) are lost, and therefore it is not possible to properly restore the subsequently transmitted frames 72A, 73A, 82A, and 83A including compressed headers (frames 72B, 73B, 82B, and 83B at the receiving nodes). However, examples in FIGS. 7 and 8 have different round trip times RTT. The round trip time RTT is the time taken from when the transmitting nodes transmit the frames 71A and 81A including uncompressed headers, to when the transmitting nodes receive error recovery requests from the receiving nodes and transmit the next frames 74A and 84A including uncompressed headers (frames 74B and 84B at the receiving nodes). In FIG. 7, the round trip time RTT is short, and therefore there are only three frames that are lost or not properly restored, i.e., the frames 71A through 73A (frames 71B through 73B at the receiving node). However, in FIG. 8, the round trip time RTT is long, and therefore there are 14 frames that are lost or not properly restored, i.e., the frames 81A through 83A (frames 81B through 83B at the receiving node). The time period during which it is not possible to restore the frames is referred to as a non-restorable period.

Meanwhile, as specified by RFC 3095, the operation mode of ROHC may be switched between a one-way mode and a two-way mode. The switching is performed as the receiving node transmits a PDCP frame to the transmitting node.

Figure 9:
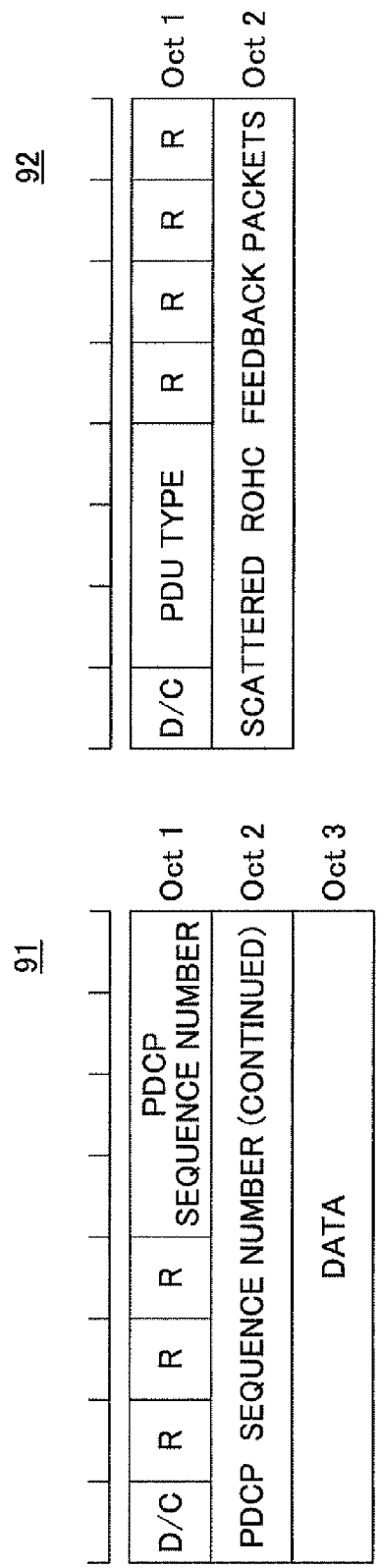
FIG. 9 illustrates a frame format of PDCP.

Next, a description is given of a header of PDCP. FIG. 9 illustrates a frame format of PDCP. In FIG. 9, 91 indicates a PDCP data PDU format, and 92 indicates a PDCP control PDU format. Parameters included in the respective formats are indicated in Table 1.

TABLE 1

| PARAMETER | LENGTH | CONTENTS |
| --- | --- | --- |
| D/C | 1 | INDICATE WHETHER Data PDU OR Control PDU.<br>0: Control PDU<br>1: Data PDU |
| PDU TYPE | 3 | INDICATE TYPE OF Control PDU.<br>000: PDCP Status Report<br>001: Header Compression Feedback Information<br>010-111: Reserved |
| R | 1 | Reserved |
| PDCP SEQUENCE NUMBER | 12 | INDICATE SEQUENCE NUMBER (SN). |

When a frame including an uncompressed header is lost in the transmission path and the context is lost, the non-restorable period is defined as follows. That is, in a one-way mode, the non-restorable period is from when the receiving node receives the frame 51B including an uncompressed header, to when the receiving node receives the next frame including an uncompressed header, as illustrated in FIG. 5. Meanwhile, in a two-way mode, the non-restorable period is determined according to the round trip time RTT, as illustrated in FIGS. 7 and 8.

The round trip time RTT changes according to changes in the distance and the path between the user terminal (UE) and the base station (eNB) caused by the movement of the user terminal. Furthermore, the round trip time RTT also changes according to changes in the quality of wireless communications. When the quality of wireless communications is degraded, the frames are more frequently resent by ARQ/HARQ executed at the RLC layer and the MAC layer at the bottom of the PDCP layer. Consequently, the round trip time RTT at the PDCP layer is increased.

Therefore, by dynamically and appropriately switching between the one-way mode and the two-way mode according to the round trip time RTT, the non-restorable period can be shortened. Accordingly, it is possible to mitigate a decline in the quality of voices provided to the user.

Figure 10:
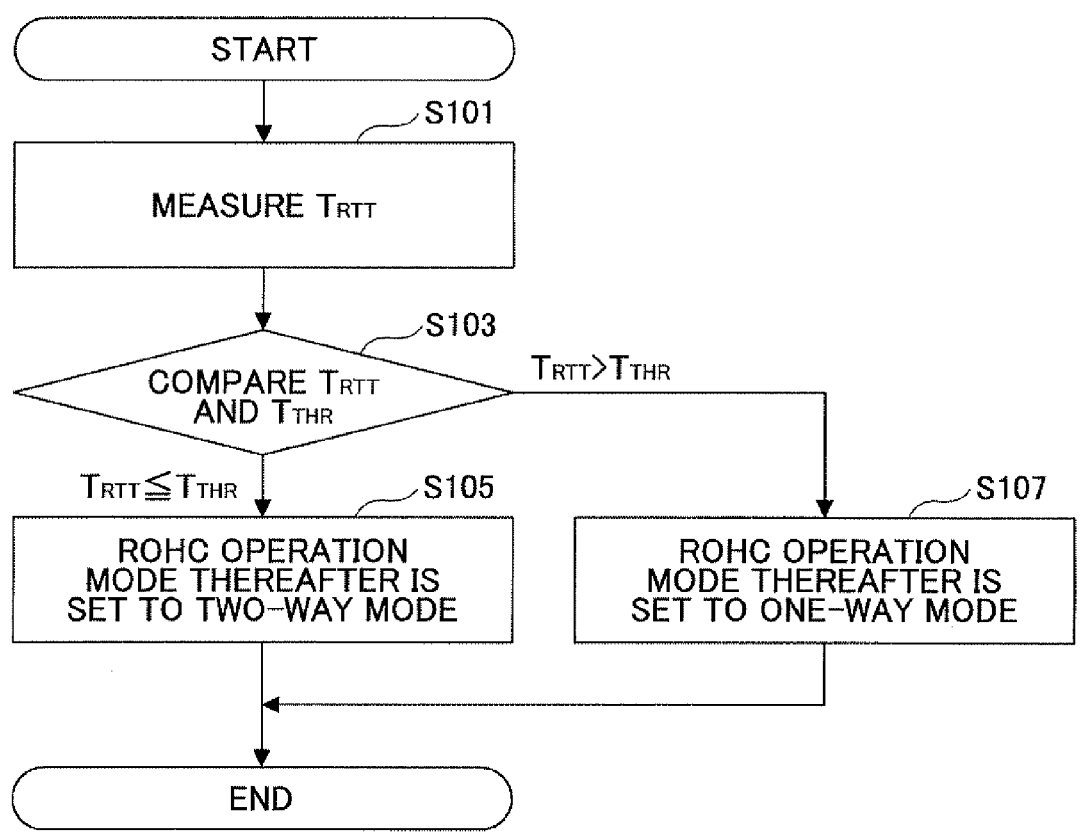
FIG. 10 illustrates a method of switching ROHC operation modes according to one embodiment.

FIG. 10 illustrates a method of switching ROHC operation modes according to one embodiment. First, in step S101, the receiving node measures the round trip time RTT ($T_{RTT}$). The specific measurement method is described with reference to FIG. 12.

Next, in step S103, the measured round trip time RTT ($T_{RTT}$) and a predetermined threshold $T_{THR}$ are compared. For example, in the one-way mode, the threshold $T_{THR}$ is the time extending from when a frame including a compressed header (transmitted immediately after a frame including an uncompressed header) is transmitted, to when the next frame including an uncompressed header is transmitted. Specifically, in the one way mode, the threshold $T_{THR}$ is the time obtained by subtracting a frame transfer period ($T_X$) from a transmission period ($T_{REF}$) of frames including uncompressed headers (hereinafter, also referred to as a refresh period). This is expressed by the following formula (1).

$$T_{THR} = T_{REF} - T_X \qquad (1)$$

As a result of the comparison performed at step S103, when $T_{RTT}$ is less than or equal to $T_{THR}$, the process proceeds to step S105, where the ROHC operation mode thereafter is set to a two-way mode (bidirectional optimistic mode). Then, the process ends.

Meanwhile, as a result of the comparison performed at step S103, when $T_{RTT}$ is greater than $T_{THR}$, the process proceeds to step S107, where the ROHC operation mode thereafter is set to a one-way mode (unidirectional mode). Then, the process ends.

FIGS. 11A through 11D illustrate examples of non-restorable periods in different ROHC operation modes. It is assumed that the frame transfer period $T_X$ is 20 [ms] and the refresh period $T_{REF}$ in the one-way mode is 120 [ms]. In this case, the predetermined threshold $T_{THR}$ is obtained as $T_{THR}=120-20=100$ [ms], according to the formula (1).

In the one-way mode, as illustrated in FIG. 11A, it is assumed that the transmitting node transmits a frame 111A including an uncompressed header, but the frame 111A is lost due to some reason and does not reach the receiving node. That is to say, it is assumed that a frame 111B including the uncompressed header corresponding to the frame 111A is lost, and therefore the receiving node does not receive the frame 111B.

After transmitting the frame 111A, the transmitting node transmits frames 112A and 113A including compressed headers, to the receiving node. The frames 112A and 113A reach the receiving node (as frames 112B and 113B) without being lost. However, because the frame 111B has been lost, it is not possible for the receiving node to use the context of the frame 111B, and therefore it is not possible for the receiving node to properly restore the frames 112B and 113B. Accordingly, it is not possible for the receiving node to restore the received frames, until the receiving node receives the next frame 114A including an uncompressed header (frame 114B) from the transmitting node. Consequently, the non-restorable period at the receiving node is 120 [ms].

Meanwhile, in the two-way mode, as illustrated in FIGS. 11B through 11D, it is assumed that the transmitting node transmits the frame 111A including an uncompressed header, but the frame 111A is lost due to some reason and does not reach the receiving node. That is to say, it is assumed that the frame 111B including the uncompressed header corresponding to the frame 111A is lost, and therefore the receiving node does not receive the frame 111B.

After transmitting the frame 111A, the transmitting node transmits the frame 112A including a compressed header, to the receiving node. The frame 112A reaches the receiving node (as the frame 112B) without being lost. However, because the frame 111B has been lost, it is not possible for the receiving node to use the context of the frame 111B, and therefore it is not possible for the receiving node to properly restore the frame 112B. Accordingly, the receiving node transmits a context request (feedback) to the transmitting node.

Before receiving the context request (feedback) from the receiving node, the transmitting node transmits the frames 113A including compressed headers. These frames 113A also reach the receiving node (as the frames 113B) without being lost. However, because the frame 111B has been lost, it is not possible for receiving node to use the context of the frame 111B, and therefore it is not possible for the receiving node to properly restore the frames 113B either.

When the context request is received from the receiving node, the transmitting node transmits the frame 114A including an uncompressed header. The frame 114A reaches the receiving node (as the frame 114B) without being lost.

As illustrated in FIG. 11B, as a result of comparing the round trip time RTT ($T_{RTT}$) and the threshold $T_{THR}$ when $T_{RTT} < T_{THR}$ is satisfied ($T_{RTT}=80$ [ms] in FIG. 11B), the two-way mode is selected as the ROHC operation mode, according to the flowchart of FIG. 10. By selecting the two-way mode, when a frame including an uncompressed header is lost in the transmission path, the non-restorable period at the receiving node becomes shorter (100 [ms] in FIG. 11B) than the non-restorable period (120 [ms]) in the one-way mode. Accordingly, it is possible to mitigate a decline in the quality of voices provided to the user.

Furthermore, as illustrated in FIG. 11C, as a result of comparing the round trip time RTT ($T_{RTT}$) and the threshold $T_{THR}$, when $T_{RTT}=T_{THR}$ is satisfied ($T_{RTT}=100$ [ms] in FIG. 11C), the two-way mode is selected as the ROHC operation mode, according to the flowchart of FIG. 10. By selecting the two-way mode, when a frame including an uncompressed header is lost in the transmission path, the non-restorable period at the receiving node becomes the same (120 [ms] in FIG. 11C) as the non-restorable period (120 [ms]) in the one-way mode. Accordingly, the extent of decline in the quality of voices provided to the user is the same as that in the one-way mode. In this case, from the viewpoint of the usage efficiency of the transmission path, the two-way mode is preferably selected as the ROHC operation mode, because the context is transmitted only when necessary. However, in other embodiments, the one-way mode may be selected.

Furthermore, as illustrated in FIG. 11D, as a result of comparing the round trip time RTT ($T_{RTT}$) and the threshold $T_{THR}$, when $T_{RTT} > T_{THR}$ is satisfied ($T_{RTT}=120$ [ms] in FIG. 11D), the one-way mode is selected as the ROHC operation mode, according to the flowchart of FIG. 10. If the two-way mode is selected, when a frame including an uncompressed header is lost in the transmission path, the non-restorable period at the receiving node becomes larger (140 [ms] in FIG. 11D) than the non-restorable period (120 [ms]) in the one-way mode. Accordingly, in this case, rather then selecting the two-way mode, by selecting the one-way mode, it is possible to mitigate a decline in the quality of voices provided to the user.

In the one-way mode, the context request is not made. Even in the two-way mode, the context request is made only when necessary. Therefore, although it is necessary to measure the round trip time RTT for the purpose of switching operation modes, it is not possible to measure the round trip time RTT when necessary. However, the round trip time RTT is preferably measured only with the use of the PDCP function that is a standard protocol in the LTE system.

Thus, the round trip time RTT is measured in step S101 of FIG. 10 with the use of a control PDU in the PDCP layer.

Figure 12:
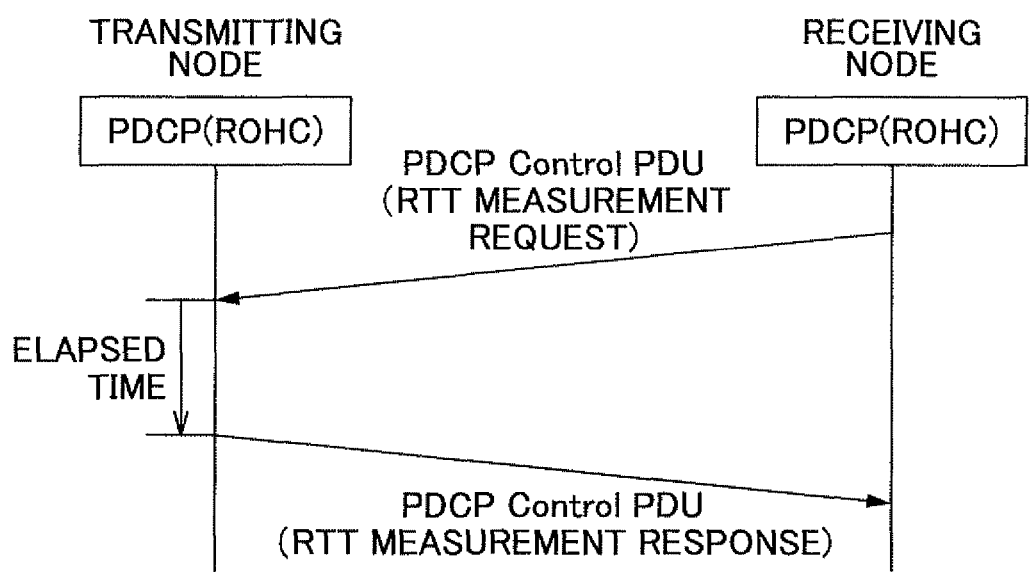
FIG. 12 illustrates a measurement method of RTT.

Specifically, as illustrated in FIG. 12, first, the receiving node transmits a PDCP Control PDU (RTT measurement request) to the transmitting node. When the PDCP Control PDU (RTT measurement request) is received from the receiving node, the transmitting node returns a PDCP Control PDU (RTT measurement response). In the PDCP Control PDU (RTT measurement response), the elapsed time from when the transmitting node receives the PDCP Control PDU (RTT measurement request) is stored. When the PDCP Control PDU (RTT measurement response) is received, the receiving node obtains the round-trip time in the transmission path, based on the transmission time in the PDCP Control PDU (RTT measurement request), the reception time of the PDCP Control PDU (RTT measurement response), and information stored in the PDCP Control PDU (RTT measurement response). An internal process time (known) is added to the round-trip time. The internal process time is the time from when the receiving node receives the non-restorable frame to when the receiving node transmits a context request (feedback). Accordingly, the round trip time RTT is obtained, which is the time from when the transmitting node transmits the frame that is not restorable to the receiving node to when the transmitting node receives feedback from the receiving node.

In order to implement such a method of measuring the round trip time RTT, an RTT measurement request and an RTT measurement response are newly added to the PDU types of PDCP Control PDUs. FIG. 13 illustrates frame formats of the RTT measurement request and the RTT measurement response. In FIG. 13, 131 indicates an RTT measurement request and 132 indicates an RTT measurement response. The frame formats follow other examples of PDCP Control PDUs specified by TS36.323. Parameters included in the respective formats are indicated in Table 2.

TABLE 2

| PARAMETER | LENGTH | CONTENTS |
|---|---|---|
| D/C | 1 | INDICATE WHETHER Data PDU OR Control PDU. 0: Control PDU 1: Data PDU |
| PDU TYPE | 3 | INDICATE TYPE OF Control PDU. 000: PDCP Status Report 001: Header Compression Feedback Information 010: RTT Measurement Request 011: RTT Measurement Response 100-111: Reserved |
| MUI | 12 | Message Unit Identifier. USE FOR ASSOCIATING RTT MEASUREMENT REQUEST AND RTT MEASUREMENT RESPONSE. VALUE IS 000 h ~FFFh. |
| DRMR | 32 | Delay since RTT Measurement Request. INDICATE ELAPSED TIME AFTER RECEIVING RTT MEASUREMENT REQUEST. TOP 32 BITS ARE USED TO EXPRESS SECONDS, AND BOTTOM 32 BITS ARE USED TO EXPRESS MILLISECONDS. |

As indicated in Table 2, an RTT measurement request and an RTT measurement response are added as Control PDUs. MUI and DRMR are added as the parameters used by the RTT measurement request and the RTT measurement response.

The round trip time RTT ($T_{RTT}$) is obtained by formula (2), based on an RTT measurement request transmission time ($T_{TX}$), an RTT measurement response reception time ($T_{RX}$), DRMR ($T_{DRMR}$) stored in the RTT measurement response, and an internal process time ($T_{INS}$) from when the receiving node receives the non-restorable frame to when the receiving node transmits feedback.

$$T_{RTT} = T_{RX} - T_{TX} - T_{DRMR} + T_{INS} \quad (2)$$

As described above, it is possible to measure the round trip time RTT with only the use of the PDCP function that is a standard protocol in the LTE system. Therefore, the above-described process may be easily installed in an existing system.

In formula (1) of $T_{THR} = T_{REF} - T_X$, it is implicitly assumed that there is only one lost frame (i.e., only the frame 111B indicated in FIGS. 11B through 11D). However, there may be cases where some of the subsequent frames 112B and 113B are lost as well. Therefore, in another embodiment, sequence numbers (SN) in the PDCP layer are monitored at the receiving node. When plural frames are continuously lost, this is applied to the threshold ($T_{THR}$) for RTT. Specifically, the sequence numbers in the PDCP layer are monitored at the receiving node. Assuming that m ($\geq 2$) is the worst-case (greatest) value of the number of lost frames confirmed since monitoring has started (i.e., skipped sequence numbers), the threshold ($T_{THR}$) for RTT is preferably calculated by the following formula (3).

$$T_{THR} = T_{REF} - (T_X \times m) \quad (3)$$

By using formula (3), even if plural frames are continuously lost in the transmission path, it is possible to select the appropriate ROHC operation mode.

FIGS. 14A through 14D illustrate examples of non-restorable periods for the respective ROHC operation modes in an ROHC operation mode switching method according to the above-described embodiment. Here, it is assumed that three frames are continuously lost in the transmission path, led by a frame including an uncompressed header. That is to say, it is assumed that the sequence numbers in the PDCP layer are monitored at the receiving node, and m=3 is the worst-case value of skipped sequence numbers confirmed since monitoring has started. Furthermore, it is assumed that the frame transfer interval is 20 [ms], and the refresh period in the one-way mode is 120 [ms].

In the one-way mode, as indicated in FIG. 14A, it is assumed that the transmitting node transmits a frame 141A including an uncompressed header, but the frame 141A is lost due to some reason and does not reach the receiving node. That is to say, it is assumed that a frame 141B including the uncompressed header corresponding to the frame 141A is lost, and therefore the receiving node does not receive the frame 141B.

It is assumed that after transmitting the frame 141A, the transmitting node transmits frames 142A including compressed headers to the receiving node, but these frames 142A do not reach the receiving node either. Thus, the receiving node does not receive frames 142B including the compressed headers corresponding to the frames 142A. Then, the transmitting node transmits frames 143A and 144A to the receiving node. The frames 143A and 144A reach the receiving node (as frames 143B and 144B) without being lost. However, because the frame 141B has been lost, it is not possible for the receiving node to use the context of the frame 141B, and therefore it is not possible for the receiving node to properly restore the frames 143B and 144B. Accordingly, it is not possible for the receiving node to restore the received frames, until the receiving node receives the next frame 145A including an uncompressed header (frame 145B) from the transmitting node. Consequently, the non-restorable period at the receiving node is 120 [ms].

Meanwhile, in the two-way mode, as illustrated in FIGS. 14B through 14D, it is assumed that the transmitting node transmits the frame 141A including an uncompressed header, but the frame 141A is lost due to some reason and does not reach the receiving node. That is to say, it is assumed that the frame 141B including the uncompressed header corresponding to the frame 141A is lost, and therefore the receiving node does not receive the frame 141B.

It is assumed that after transmitting the frame 141A, the transmitting node transmits the frames 142A including compressed headers to the receiving node, but the frames 142A do not reach the receiving node (the receiving node does not receive corresponding frames 142B). Furthermore, the transmitting node transmits the frame 143A including a compressed header, and the frame 143A reaches the receiving node (as the frame 143B) without being lost. However, because the frame 141B has been lost, it is not possible for the receiving node to use the context of the frame 141B, and therefore it is not possible for the receiving node to properly restore the frame 143B. Accordingly, the receiving node transmits a context request (feedback) to the transmitting node.

Before receiving the context request (feedback) from the receiving node, the transmitting node transmits the frames 144A including compressed headers. These frames 144A also reach the receiving node (as the frames 144B) without being lost. However, because the frame 141B has been lost, it is not possible for receiving node to use the context of the frame 141B, and therefore it is not possible for the receiving node to properly restore the frames 144B either.

When the context request is received from the receiving node, the transmitting node transmits the frame 145A including an uncompressed header. The frame 145A reaches the receiving node (as the frame 145B) without being lost.

As indicated in FIG. 14B, the round trip time RTT is $T_{RTT}$=80 [ms], and by comparing this with the threshold $T_{THR}$=100 [ms] that is calculated with formula (1), $T_{RTT}<T_{THR}$ is satisfied. Thus, the two-way mode is to be selected as the ROHC operation mode according to the flowchart of FIG. 10. However, the non-restorable period is 140 [ms], which is longer than the case of the one-way mode, and therefore such a selection is incorrect.

Meanwhile, by comparing the round trip time RTT of $T_{RTT}$=80 [ms] with the threshold $T_{THR}$=60 [ms] that is calculated with formula (3), $T_{RTT}>T_{THR}$ is satisfied. Thus, the one-way mode is to be selected as the ROHC operation mode according to the flowchart of FIG. 10.

Similarly, as indicated in FIGS. 14C and 14D, when $T_{RTT}\leq T_{THR}$ is satisfied upon calculating $T_{THR}$ with formula (3), the two-way mode is to be selected as the ROHC operation mode according to the flowchart of FIG. 10. Accordingly, even when plural frames led by a frame including an uncompressed header are continuously lost, the non-restorable period at the receiving node will be less than or equal to that in the one-way mode.

Next, a description is given of configurations of the transmitting node and the receiving node for implementing the transmission method described above. Here, the base station (eNB) is the transmitting node, and the user terminal (UE) is the receiving node. However, it is obvious that the base station (eNB) may be the receiving node, and the user terminal (UE) may be the transmitting node.

Figure 15:
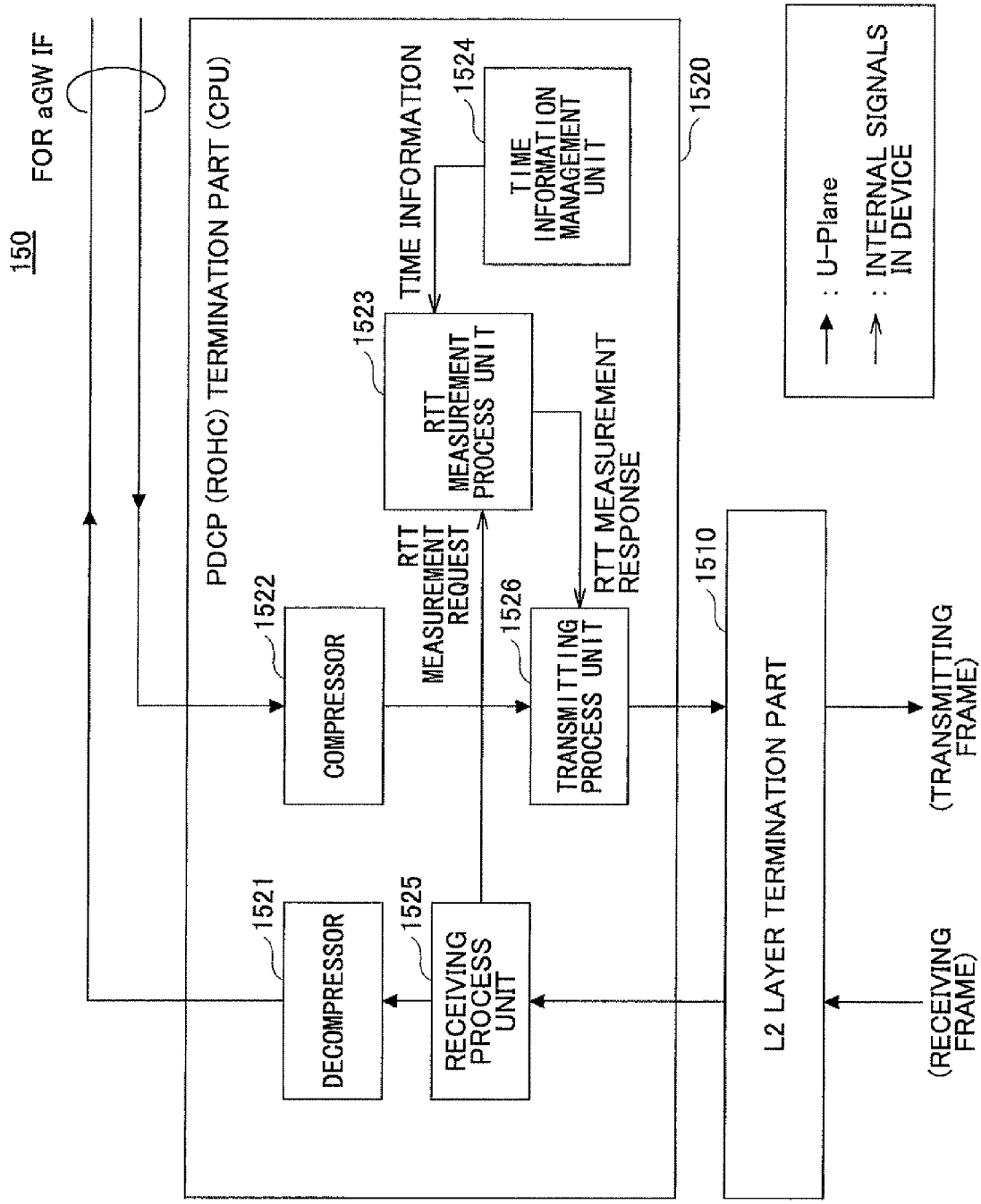
FIG. 15 illustrates a configuration of a transmitting node according to one embodiment.

FIG. 15 illustrates a configuration of the transmitting node according to one embodiment. A transmitting node 150 illustrated in FIG. 15 includes an L2 layer termination part 1510 and a PDCP (ROHC) termination part 1520. The PDCP (ROHC) termination part 1520 may be implemented by a processor (e.g., a CPU (Central Processing Unit) or a DSP (Digital Signal Processor)). The L2 layer termination part 1510 is a functional block that provides the basic functions for performing data transmission with the receiving node. The PDCP (ROHC) termination part 1520 is a functional block for terminating functions of the PDCP (ROHC) layer.

The PDCP (ROHC) termination part 1520 includes a decompressor 1521, a compressor 1522, an RTT measurement process unit 1523, a time information management unit 1524, a receiving process unit 1525, and a transmitting process unit 1526. The decompressor 1521 is a functional block for decompressing the header of ROHC. The compressor 1522 is a functional block for compressing the header of ROHC. The RTT measurement process unit 1523 is a functional block for processing a PDCP Control PDU (RTT measurement request/response). The time information management unit 1524 is a functional block for managing time information and providing the time information to the RTT measurement process unit 1523. The receiving process unit 1525 is a functional block for processing the header of the received PDCP PDU and assigning the PDCP PDU to the respective functional blocks. The transmitting process unit 1526 is a functional block for attaching headers to the PDCP PDU aggregated from the respective functional blocks and scheduling the transmission timings.

The transmitting node 150 is different from conventional transmitting nodes in that the RTT measurement process unit 1523 and the time information management unit 1524 are provided in at least the PDCP (ROHC) termination part 1520.

Figure 16:
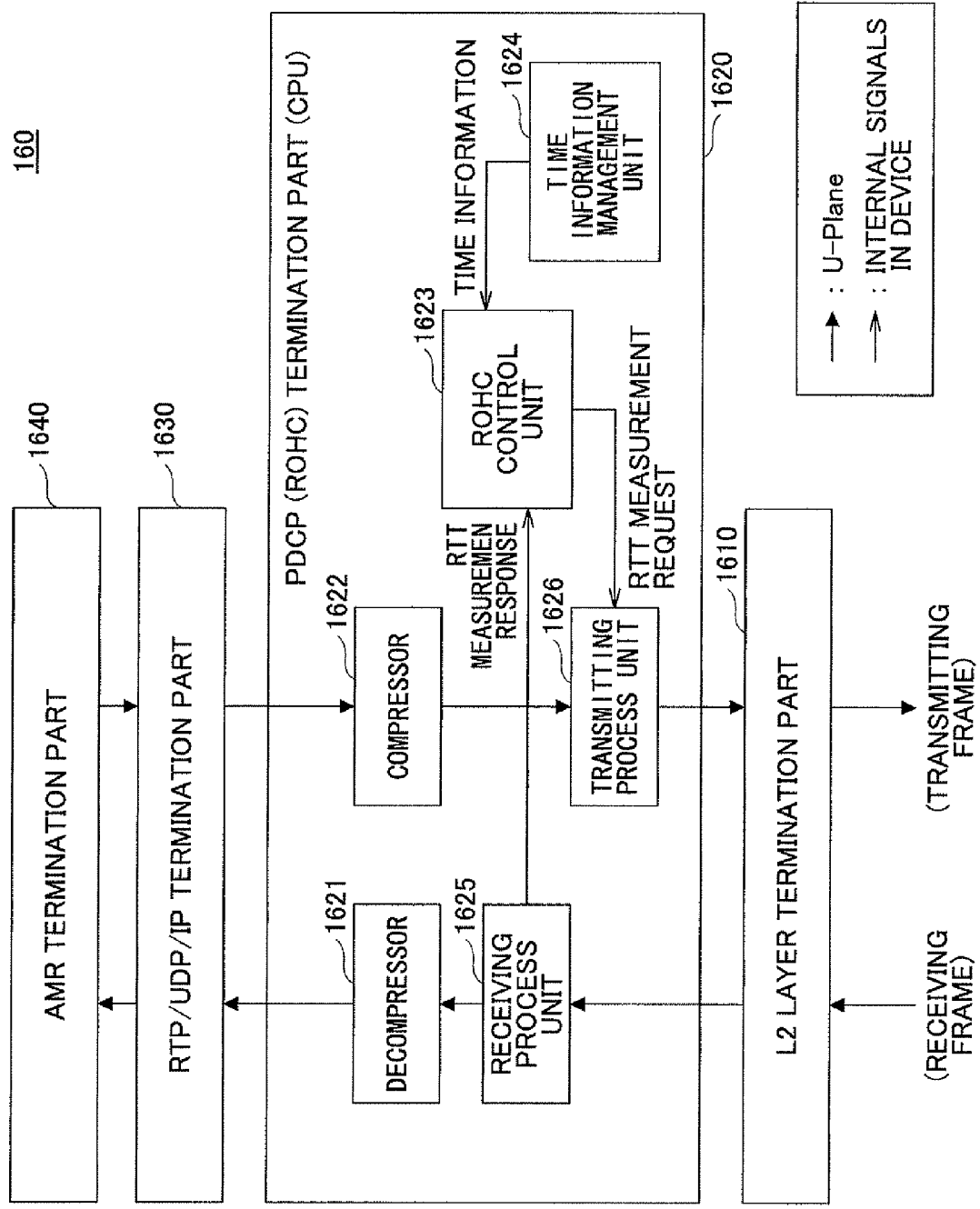
FIG. 16 illustrates a configuration of a receiving node according to one embodiment.

FIG. 16 illustrates a configuration of the receiving node according to one embodiment. A receiving node 160 illustrated in FIG. 16 includes an L2 layer termination part 1610, a PDCP (ROHC) termination part 1620, an RTP/UDP/IP termination part 1630, and an AMR termination part 1640. The PDCP (ROHC) termination part 1620 may be implemented by a processor (e.g., a CPU (Central Processing Unit) or a DSP (Digital Signal Processor)). The L2 layer termination part 1610 is a functional block that provides the basic functions for performing data transmission with the transmitting node (for example, the transmitting node 150 of FIG. 15). The PDCP (ROHC) termination part 1620 is a functional block for terminating functions of the PDCP (ROHC) layer. The RTP/UDP/IP termination part 1630 is a functional block for terminating functions of the RTP/UDP/IP layer. The AMR termination part 1640 is a functional block for encoding/decoding voice data.

The PDCP (ROHC) termination part 1620 includes a decompressor 1621, a compressor 1622, an ROHC control unit 1623, a time information management unit 1624, a receiving process unit 1625, and a transmitting process unit 1626. The decompressor 1621 is a functional block for decompressing the header of ROHC. The compressor 1622 is a functional block for compressing the header of ROHC. The RTT measurement process unit 1623 is a functional block for measuring RTT with the use of a PDCP Control PDU (RTT measurement request/response) and controlling the ROHC operation mode. The time information management unit 1624 is a functional block for managing time information and providing the time information to the RTT measurement process unit 1623. The receiving process unit 1625 is a functional block for processing the header of the received PDCP PDU and assigning the PDCP PDU to the respective functional blocks. The transmitting process unit 1626 is a functional block for attaching headers to the PDCP PDU aggregated from the respective functional blocks and scheduling the transmission timings.

The receiving node 160 is different from conventional receiving nodes in that the ROHC control unit 1623 and the time information management unit 1624 are provided in at least the PDCP (ROHC) termination part 1620.

Descriptions of the transmitting node 150 and the receiving node 160 according to one embodiment are given above with reference to FIGS. 15 and 16. Next, a description is given of operations of these nodes. In the following description, it is assumed that the transmitting node 150 and the receiving node 160 operate in coordination with each other. However, it is obvious that the transmitting node 150 may operate in coordination with a receiving node other than the receiving node 160 that has the same functions as the receiving node 160. Furthermore, it is obvious that the receiving node 160 may operate in coordination with a transmitting node other than the transmitting node 150 that has the same functions as the transmitting node 150.

The receiving node 160 generates an RTT measurement request (see FIG. 12). Specifically, the ROHC control unit 1623 generates an RTT measurement request. Every time an RTT measurement request is generated, a parameter (MUI) (see FIG. 13) to be included in the RTT measurement request is incremented and attached to the RTT measurement request. The receiving node 160 transmits the generated RTT measurement request. Specifically, the RTT measurement request is transmitted from the ROHC control unit 1623 to the transmitting node 150 via the transmitting process unit 1626. Furthermore, the ROHC control unit 1623 manages the parameter MUI attached to the RTT measurement request and the time when the RTT measurement request is transmitted, based on time information obtained from the time information management unit 1624.

The transmitting node 150 receives the RTT measurement request transmitted by the receiving node 160. When the RTT measurement request is received, the transmitting process unit 1526 transfers the received RTT measurement request (PDU) to the RTT measurement process unit 1523. The RTT measurement process unit 1523 manages the time when the RTT measurement request is received, based on time information obtained from the time information management unit 1524.

Next, the transmitting node 150 generates an RTT measurement response (see FIG. 12). Specifically, the RTT measurement process unit 1523 generates the RTT measurement response. The value of the parameter MUI (see FIG. 13) to be included in the RTT measurement response is the same as that attached to the received RTT measurement request. The elapsed time (see FIG. 12) from when the RTT measurement request is received to when the RTT measurement response is transmitted is stored in the parameter DRMR (see FIG. 13). Actually, the scheduled time to transmit the RTT measurement response may be determined based on time information obtained from the time information management unit 1524, and this may be stored as the elapsed time. The transmitting node 150 transmits the RTT measurement response. Specifically, when it is the scheduled time to transmit the RTT measurement response that has been determined in the previous step, the RTT measurement process unit 1523 sends the RTT transmission response to the receiving node 160 via the transmitting process unit 1526.

The receiving node 160 receives the RTT measurement response that has been transmitted by the transmitting node 150. Specifically, when the RTT measurement response is received, the receiving process unit 1625 transfers the received RTT measurement response (PDU) to the ROHC control unit 1623. The ROHC control unit 1623 manages the time of receiving the RTT measurement response based on time information obtained from the time information management unit 1624.

Next, the receiving node 160 calculates the round trip time RTT. Specifically, the ROHC control unit 1623 calculates the round trip time RTT ($T_{RTT}$) based on formula (2). Then, the receiving node 160 determines the ROHC operation mode. Specifically, the ROHC control unit 1623 obtains the threshold ($T_{THR}$) for the RTT based on the refresh period ($T_{REF}$) and the frame transfer period ($T_X$) in the one-way mode, and determines the operation mode to be applied thereafter according to the flowchart of FIG. 10.

Finally, the receiving node 160 changes the ROHC operation mode. When the present ROHC operation mode and the operation mode determined according to the flowchart of FIG. 10 are different, a process is performed to change the operation mode to that determined according to the flowchart of FIG. 10. For example, a process specified by RFC3095 may be performed to change the operation mode, and therefore the process is not further described. When the present ROHC operation mode and the operation mode determined according to the flowchart of FIG. 10 are the same, the present operation mode is maintained.

The above sequence of procedures may be implemented when transmission of a PDCP Data PDU starts, and then at predetermined subsequent periods, although not so limited.

Figure 17:
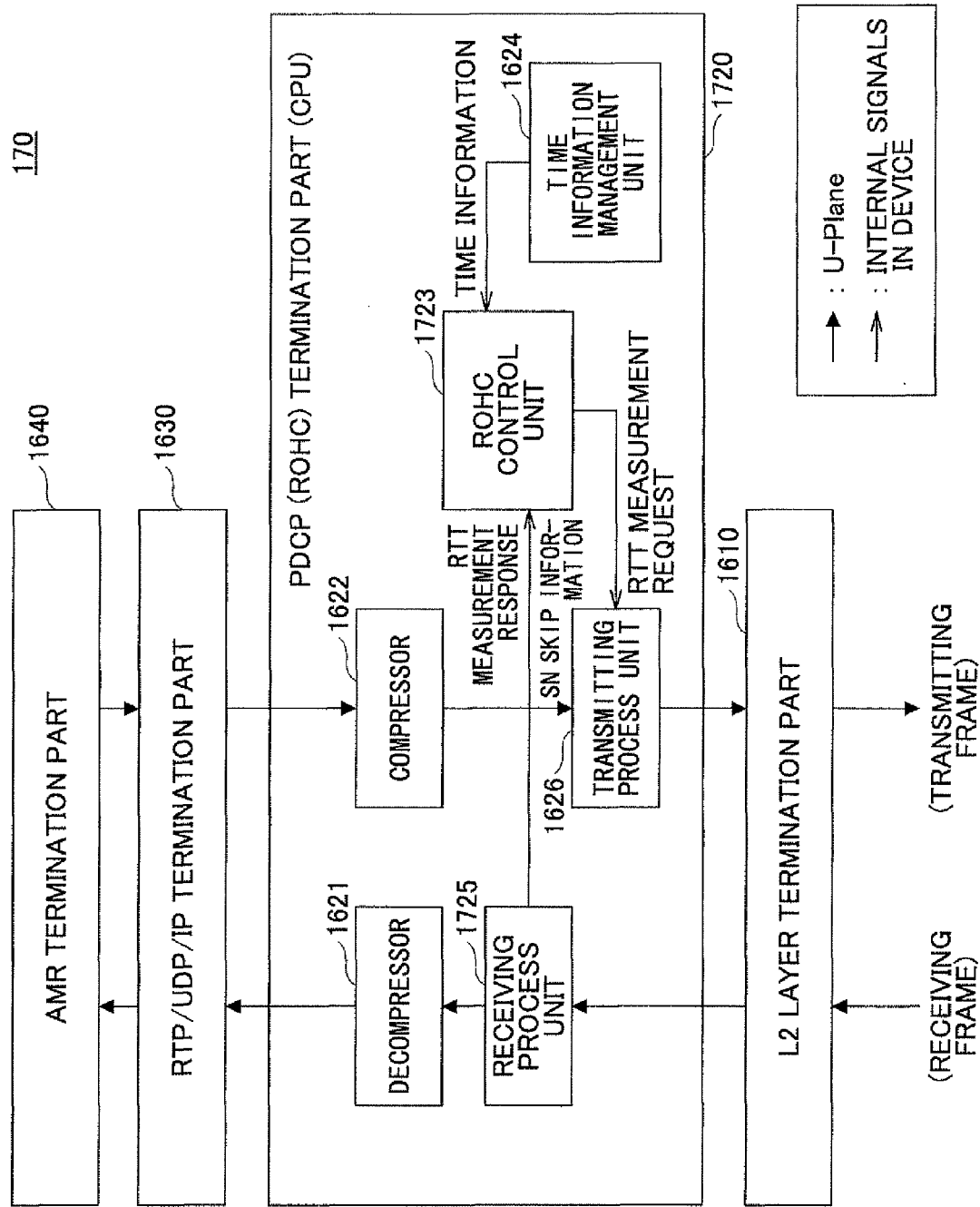
FIG. 17 illustrates a configuration of a receiving node according to another embodiment.

FIG. 17 illustrates a configuration of a receiving node according to another embodiment. In a receiving node 170 illustrated in FIG. 17, a receiving process unit 1725 included in a PDCP (ROHC) termination part 1720 monitors sequence numbers (SN) of received frames (PDCP Data PDU). The PDCP (ROHC) termination part 1720 may be implemented by a processor (e.g., a CPU (Central Processing Unit) or a DSP (Digital Signal Processor)). The difference between the receiving node 170 illustrated in FIG. 17 and the receiving node 160 illustrated in FIG. 16 is that in the receiving node 170, when the receiving process unit 1725 detects that m (1) number of sequence numbers (SN) have been skipped, the receiving process unit 1725 reports the value m as SN skip information to a ROHC control unit 1723. Accordingly, when plural frames are lost as described with reference to FIGS. 14B through 14D, the ROHC operation mode is switched to the appropriate mode.

A description is given of procedures performed for monitoring sequence numbers (SN) of PDCP Data PDUs and applying the monitored results for controlling the ROHC operation mode. A sequence number (SN) is the sequence number (SN) of a PDCP Data PDU received by the receiving node 170.

In the receiving node 170, the receiving process unit 1725 starts monitoring sequence numbers (SN) when PDCP Data PDU transmission starts. When the difference m(=$SN_n$ − $SN_{n-1}$) between the sequence number ($SN_n$) of a presently received PDU and a sequence number ($SN_{n-1}$) of a PDU received immediately before the presently received PDU is two or more, the receiving process unit 1725 detects that "SN skip" has occurred (a state where one or more sequence numbers SN are skipped), and reports the value m as SN skip information to the ROHC control unit 1723.

The ROHC control unit 1723 manages the worst-case value of the SN skip, and when SN skip information is reported from the receiving process unit 1725, the ROHC control unit 1723 compares the reported value m with the worst-case value of the SN skip. When it is found that the reported m value is larger than the worst-case value as a result of the comparison, the ROHC control unit 1723 updates the worst-case value of the SN skip to m. Then, based on the worst-case value m of the SN skip, the ROHC control unit 1723 calculates the RTT threshold ($T_{THR}$) of RTT with formula (3), and applies the calculation result to the procedure of controlling the ROHC operation mode.

FIG. 18 illustrates an example of measuring RTT. This is a specific example of the process of measuring the round trip time RTT ($T_{RTT}$) described with reference to FIG. 12. The time is managed by an NTP time stamp (configured with 64 bits, in which the top 32 bits express the seconds from 1900 (year)/1 (month)/1 (date)/0 (hour)/0 (min.)/0 (sec.), and the bottom 32 bits express the decimal points of the seconds). For the purpose of comparing times, the center 32 bits are used (bold characters in FIG. 18). Values of formula (2) are indicated in the center of FIG. 18. It is assumed that $T_{INS}$ is given as a known value.

While descriptions are given with reference to specific embodiments, the respective embodiments are merely exemplary, so that a skilled person will understand variations, modifications, alternatives, and replacements and the like. While specific examples of values are used in the above description, such values are merely exemplary unless otherwise mentioned, and any appropriate value may be used. The separate embodiments and examples are not essentially divided; two or more embodiments or examples may be combined.

For convenience of explanation, while the apparatus according to the embodiments is explained using functional block diagrams, such an apparatus as described above may be implemented in hardware, software, or a combination thereof.

The present invention is not limited to the above embodiments and examples, so that variations, modifications, alternatives, and replacements are included in the present invention without departing from the spirit of the present invention.

According to an aspect of the invention, a packet transmission method and nodes are provided, which are capable of transmitting a packet including context information within a short period of time, when a packet including context information is lost.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A packet transmission method comprising:
   measuring a time taken for feedback indicating that a packet including context information has been lost; and
   switching between a first mode and a second mode based on a result from comparing the measured time taken for the feedback with a threshold acquired in the first mode, the first mode being a mode for periodically transmitting a packet including the context information and the second mode being a mode for transmitting a packet including the context information in response to the feedback indicating that a packet including the context information has been lost, wherein the switching includes switching between the first mode that is a unidirectional mode of RObust Header Compression (ROHC) and the second mode that is a bidirectional optimistic mode of ROHC.

2. The packet transmission method according to claim 1, wherein the measuring includes transmitting a measurement request from a receiving node to a transmitting node, and transmitting a measurement response from the transmitting node to the receiving node, the measurement response indicating an elapsed time from when the measurement request is received.

3. The packet transmission method according to claim 1, wherein the switching between the first mode and the second mode includes monitoring lost packets, and comparing the measured time taken for the feedback with the threshold corresponding to a number of the lost packets in the first mode.

4. The packet transmission method according to claim 1, wherein the measuring includes measuring the time that is a round trip time taken for the feedback that is a context request of ROHC.

5. A receiving node comprising:
   a control unit that
   measures a time taken for feedback indicating that a packet including context information has been lost, and that
   causes a transmitting node to switch between a first mode and a second mode based on a result from comparing the measured time taken for the feedback with a threshold acquired in the first mode, the first mode being a mode for periodically transmitting a packet including the context information and the second mode being a mode for transmitting the packet including the context information in response to the feedback from the receiving node, wherein the switch includes switching between the first mode that is a unidirectional mode of RObust Header Compression (ROHC) and the second mode that is a bidirectional optimistic mode of ROHC.

6. The receiving node according to claim 5, further comprising: a time information management unit that supplies time information to the control unit, wherein the control unit uses the time information to transmit, to the transmitting node, a measurement request requesting to measure the time taken for the feedback in the second mode, and to measure the time taken for the feedback based on a measurement response received from the transmitting node that is transmitted in response to the measurement request.

7. The receiving node according to claim 5, further comprising: a reception process unit that monitors lost packets, wherein the control unit compares the measured time taken for the feedback with the threshold corresponding to a number of the lost packets in the first mode, and causes the transmitting node to switch between the first mode and the second mode based on a result of the comparison.

8. A transmitting node comprising:
   a measurement process unit that
   receives, from a receiving node, a measurement request requesting to measure a time taken for feedback from the receiving node, the feedback indicating that a packet including context information has been lost,
   transmits a measurement response indicating an elapsed time from when the measurement request is received, and
   transmits data packets in a mode switched by the receiving node based on the measurement response, wherein the switch includes switching between the first mode that is a unidirectional mode of RObust Header Compression (ROHC) and the second mode that is a bidirectional optimistic mode of ROHC.

9. The transmitting node according to claim 8, wherein the measurement process unit includes a time information management unit that supplies time information to the measurement process unit, wherein the measurement process unit uses the time information to transmit the measurement response indicating the elapsed time from when the measurement request is received.

10. The receiving node according to claim 5, wherein functions of the receiving node are implemented by a processor.

11. The transmitting node according to claim 8, wherein functions of the receiving node are implemented by a processor.

* * * * *

UNITED STATES PATENT AND TRADEMARK OFFICE
CERTIFICATE OF CORRECTION

| | | |
|---|---|---|
| PATENT NO. | : 8,537,708 B2 | Page 1 of 1 |
| APPLICATION NO. | : 13/048518 | |
| DATED | : September 17, 2013 | |
| INVENTOR(S) | : Yabe et al. | |

It is certified that error appears in the above-identified patent and that said Letters Patent is hereby corrected as shown below:

On the title page item (75) Inventors: the third inventor's name is misspelled "Yashushi Miyagawa" should be rendered "Yasushi Miyagawa" instead.

Signed and Sealed this
Twelfth Day of November, 2013

Teresa Stanek Rea
*Deputy Director of the United States Patent and Trademark Office*